(12) United States Patent
Lamb et al.

(10) Patent No.: US 9,105,210 B2
(45) Date of Patent: *Aug. 11, 2015

(54) MULTI-NODE POSTER LOCATION

(75) Inventors: Mathew J. Lamb, Mercer Island, WA (US); Ben J. Sugden, Woodinville, WA (US); Robert L. Crocco, Jr., Seattle, WA (US); Brian E. Keane, Bellevue, WA (US); Christopher E. Miles, Seattle, WA (US); Kathryn Stone Perez, Kirkland, WA (US); Laura K. Massey, Redmond, WA (US); Alex Aben-Athar Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/538,829

(22) Filed: Jun. 29, 2012

(65) Prior Publication Data

US 2014/0002495 A1    Jan. 2, 2014

(51) Int. Cl.
*G09G 5/30* (2006.01)
*G09G 3/00* (2006.01)
*G06F 3/14* (2006.01)
*G02B 27/01* (2006.01)

(52) U.S. Cl.
CPC .............. *G09G 3/003* (2013.01); *G02B 27/017* (2013.01); *G06F 3/1431* (2013.01); *G02B 2027/014* (2013.01); *G02B 2027/0138* (2013.01); *G02B 2027/0178* (2013.01); *G09G 2370/022* (2013.01); *H04N 2201/3245* (2013.01); *H04N 2201/3269* (2013.01)

(58) Field of Classification Search
CPC ...................................................... G06T 19/006
USPC ........................................................... 345/633
See application file for complete search history.

(56) References Cited

U.S. PATENT DOCUMENTS 3,975,080 A    8/1976    Norman
6,181,351 B1   1/2001    Merrill
(Continued)

OTHER PUBLICATIONS

Mark Billinghurst, The Magic Book: A transitional AR interface, Computers and Graphics, 25(5), 2001, pp. 745-753.*

(Continued)

*Primary Examiner* — Javid A Amini
(74) *Attorney, Agent, or Firm* — Micah Goldsmith; Judy Yee; Micky Minhas

(57) ABSTRACT

A system for identifying an AR tag and determining a location for a virtual object within an augmented reality environment corresponding with the AR tag is described. In some environments, including those with viewing obstructions, the identity of the AR tag and the location of a corresponding virtual object may be determined by aggregating individual identity and location determinations from a plurality of head-mounted display devices (HMDs). The virtual object may comprise a shared virtual object that is viewable from each of the plurality of HMDs as existing at a shared location within the augmented reality environment. The shared location may comprise a weighted average of individual location determinations from each of the plurality of HMDs. By aggregating and analyzing individual identity and location determinations, a particular HMD of the plurality of HMDs may display a virtual object without having to identify a corresponding AR tag directly.

17 Claims, 19 Drawing Sheets

(56) References Cited

U.S. PATENT DOCUMENTS

| | | | |
|---|---|---|---|
| 6,429,867 | B1 | 8/2002 | Deering |
| 6,563,499 | B1 | 5/2003 | Waupotitsch |
| 6,772,122 | B2 | 8/2004 | Jowitt |
| 7,050,078 | B2 | 5/2006 | Dempski |
| 7,164,076 | B2 | 1/2007 | McHale |
| 7,613,613 | B2 | 11/2009 | Fields |
| 7,783,077 | B2 | 8/2010 | Miklos |
| 7,847,699 | B2 | 12/2010 | Lee |
| 2003/0012410 | A1 | 1/2003 | Navab |
| 2003/0032484 | A1* | 2/2003 | Ohshima et al. ............... 463/43 |
| 2003/0110026 | A1 | 6/2003 | Yamamoto |
| 2005/0231532 | A1* | 10/2005 | Suzuki et al. ................ 345/633 |
| 2006/0004291 | A1 | 1/2006 | Heimdal |
| 2009/0196459 | A1 | 8/2009 | Watt |
| 2009/0235162 | A1 | 9/2009 | Nuccio |
| 2009/0244097 | A1* | 10/2009 | Estevez ........................ 345/633 |
| 2010/0060662 | A1 | 3/2010 | Law |
| 2010/0100851 | A1 | 4/2010 | Clark |
| 2010/0149609 | A1 | 6/2010 | Schwerdtner |
| 2010/0253700 | A1 | 10/2010 | Bergeron |
| 2010/0257252 | A1 | 10/2010 | Dougherty |
| 2010/0287485 | A1* | 11/2010 | Bertolami et al. ............ 715/764 |
| 2010/0321540 | A1* | 12/2010 | Woo et al. ..................... 348/241 |
| 2011/0001760 | A1* | 1/2011 | Meier ............................ 345/633 |
| 2011/0025689 | A1* | 2/2011 | Perez et al. ................... 345/420 |
| 2011/0126140 | A1 | 5/2011 | Danilov |
| 2011/0216060 | A1 | 9/2011 | Weising |
| 2012/0069051 | A1 | 3/2012 | Hagbi |
| 2012/0113141 | A1* | 5/2012 | Zimmerman et al. ........ 345/633 |
| 2013/0201185 | A1* | 8/2013 | Kochi ........................... 345/419 |
| 2013/0249944 | A1* | 9/2013 | Raghoebardayal ........... 345/633 |
| 2013/0303285 | A1* | 11/2013 | Kochi et al. ................... 463/32 |

OTHER PUBLICATIONS

J. M. Und Doreen Darnell, The eyeMagic Book—A Report into Augmented Reality Storytelling in the Context of a Children's Workshop, 2003.*

Baldassari, et al., "An Open Source Engine for Embodied Animated Agents", In Proceeding of Congreso Espanol de Informatica Grafica, 2007, pp. 89-98.

Desbiens, Jacques, "Experiments in Image Composition for Synthetic Holography", In Proceedings of the 8th International Symposium on Display Holography, Jul. 13, 2009, pp. 1-9.

Ercan, et al., "On Sensor Fusion for Head Tracking in Augmented Reality Applications", In American Control Conference, Jun. 29, 2011, pp. 1286-1291.

Friedland, et al., "Text Book on Fundamentals of Multimedia Computing", Retrieved on: Feb. 14, 2012, Available at: http://mm-creole.wikispaces.com/file/view/Chapter_Context_and_Content_100804.pdf.

Gould, et al., "Integrating Visual and Range Data for Robotic Object Detection", In ECCV Workshop on Multi-camera and Multi-modal Sensor Fusion Algorithms and Applications (M2SFA2), Oct. 18, 2008, pp. 434-55.

Guo, et al., "Sixth-Sense: Context Reasoning for Potential Objects Detection in Smart Sensor Rich Environment", In Proceedings of the IEEE/WIC/ACM International Conference on Intelligent Agent Technology, Dec. 18, 2006, pp. 191-194.

Hoiem, et al., "3D LayoutCRF for Multi-View Object Class Recognition and Segmentation", In Proceedings of the IEEE Conference on Computer Vision and Pattern Recognition, Jun. 17, 2007, pp. 1-8.

Martin, et al., "Evaluation of Holographic Technology in Close Air Support Mission Planning and Execution", Published on: Jun. 2008, Available at:http://www.dtic.mil/cgi-bin/GetTRDoc?AD=ADA486177.

Nakamura, et al., "A Method for Estimating Position and Orientation with a Topological Approach using Multiple Infrared Tags", In Proceedings of Fourth International Conference on Networked Sensing Systems, Jun. 6, 2002, pp. 187-195.

Reallusion, "Crazy Talk 6 (PC DVD)", Published on: Apr. 12, 2010, Available at: http://www.amazon.co.uk/Crazy-Talk-6-PC-DVD/dp/B002DUCNL4.

Samzenpus, ""Holographic" Desk Allows Interaction with Virtual Objects", Published on: Oct. 26, 2011, Available at: http://tech.slashdot.org/story/11/10/26/1725214/holographic-desk-allows-interaction-with-virtual-objects.

Stone, et al., "Speaking with Hands: Creating Animated Conversational Characters from Recordings of Human Performance", In Proceedings of ACM SIGGRAPH, Aug. 8, 2004, pp. 506-513.

Straczynski, J. Michael, "The Great Maker: (JMS) at San Diego Comic Con '95", Retrieved on: Feb. 13, 2012, Available at:http://ubots.com/b5/jms_on_b5.shtml.

Tanaka et al., "Toward Automatic Construction of Reality-based Virtual Space Simulation", In Proceedings of 12th International Conference on Artificial Reality and Telexistence, Dec. 4, 2002, 6 pages.

Tsiatsis, et al., "Poster Abstract: On the Interaction of Network Characteristics and Collaborative Target Tracking in Sensor Networks", In Proceedings of the 1st International Conference on Embedded Networked Sensor Systems, Nov. 5, 2003, pp. 316-317.

Voice-O-Matic, 2000, www.di-o-matic.com/products/plugins/VoiceOMatic/#page=overview.

Xu, et al., "Computer-Generated Holography for Dynamic Display of 3D Objects with Full Parallax", The International Journal of Virtual Reality, Jun. 2009, pp. 33-38.

Ziegler, et al., "A Framework for Holographic Scene Representation and Image Synthesis", In Proceedings of the IEEE Transactions on Visualization and Computer Graphics, vol. 13, Issue 2, Mar. 2007, pp. 403-415.

U.S. Appl. No. 13/538,706, filed Jun. 29, 2012.

U.S. Appl. No. 13/538,848, filed Jun. 29, 2012.

Office Action dated Jul. 25, 2014, U.S. Appl. No. 13/538,848.

Notice of Allowance dated Jan. 28, 2015, U.S. Appl. No. 13/538,848.

* cited by examiner

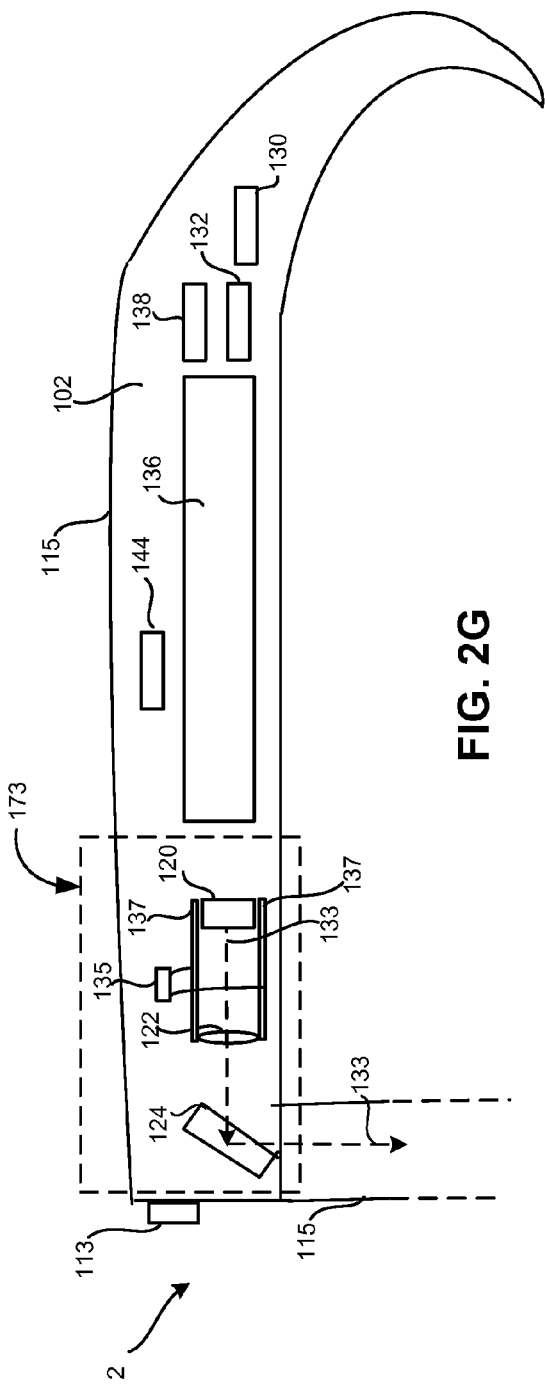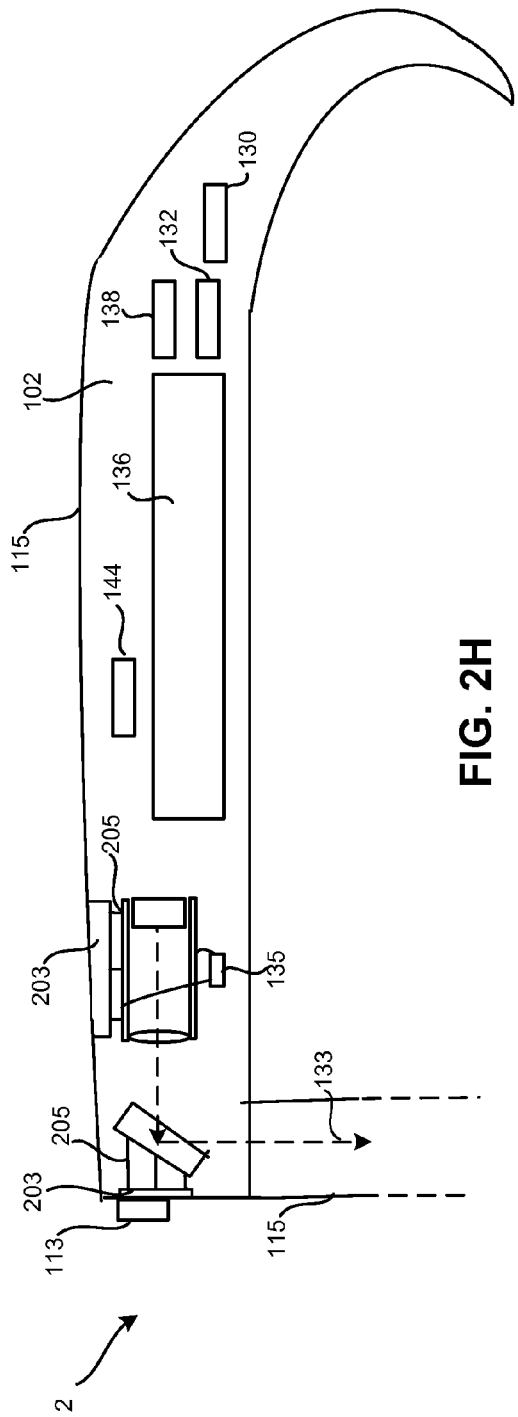

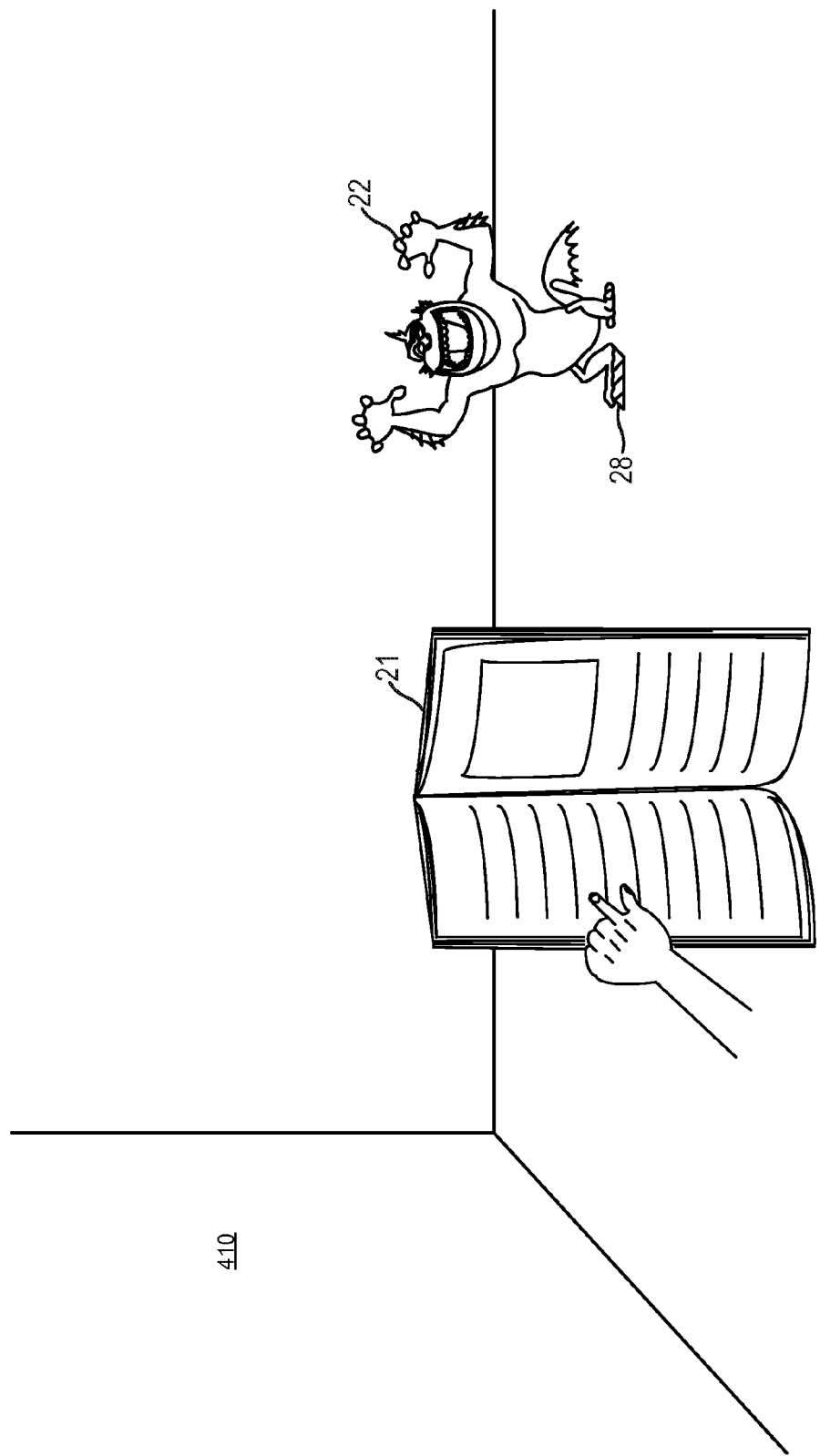

MULTI-NODE POSTER LOCATION

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for identifying an AR tag and determining a location for a virtual object within an augmented reality environment corresponding with the AR tag. In some environments, including those with viewing obstructions, the identity of the AR tag and the location of a corresponding virtual object may be determined by aggregating individual identity and location determinations from a plurality of head-mounted display devices (HMDs). The virtual object may comprise a shared virtual object that is viewable from each of the plurality of HMDs as existing at a shared location within the augmented reality environment. The shared location may comprise a weighted average of individual location determinations from each of the plurality of HMDs. By aggregating and analyzing individual identity and location determinations, a particular HMD of the plurality of HMDs may display a virtual object without having to identify a corresponding AR tag directly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2G depicts one embodiment of a side view of a portion of an HMD.

FIG. 2H depicts one embodiment of a side view of a portion of an HMD which provides support for a three dimensional adjustment of a microdisplay assembly.

FIG. 4E depicts one embodiment of an augmented reality environment 410 as seen by an end user wearing an HMD.

DETAILED DESCRIPTION

Figure 1:
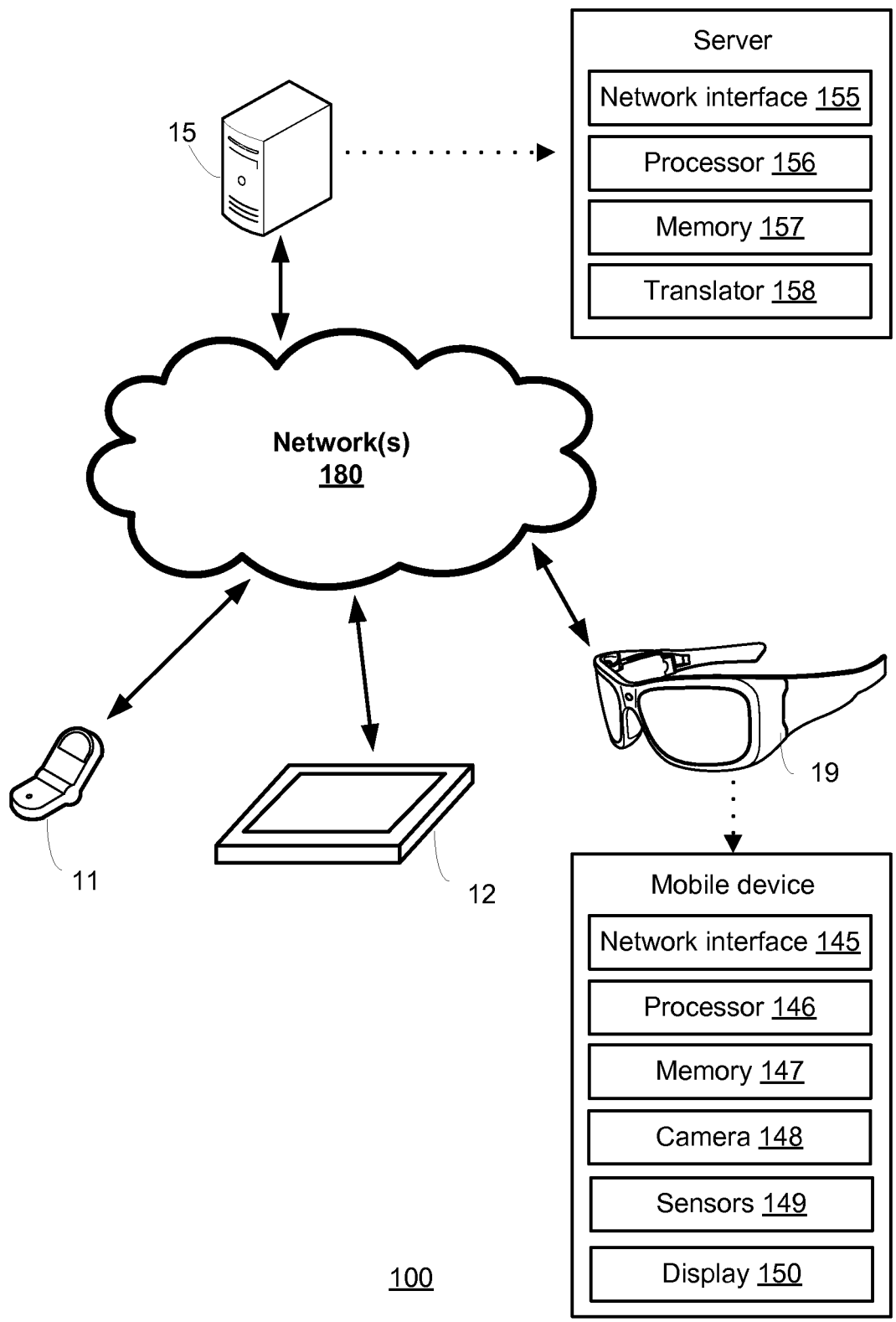
FIG. 1 is a block diagram of one embodiment of a networked computing environment in which the disclosed technology may be practiced.

Technology is described for identifying an augmented reality (AR) tag and determining a location for a virtual object within an augmented reality environment corresponding with the AR tag. In some environments, including those with viewing obstructions, the identity of the AR tag and/or the location of a corresponding virtual object may be determined by aggregating individual identity and location determinations from a plurality of mobile devices. The plurality of mobile devices may include one or more head-mounted display devices (HMDs). The virtual object may comprise a shared virtual object that is viewable from each of the plurality of mobile devices as existing at a shared location within the augmented reality environment. The shared location may comprise a weighted average (e.g., weighed based on confidence levels) of individual location determinations from each of the plurality of mobile devices. By aggregating and analyzing individual identity and location determinations, a particular mobile device of the plurality of mobile devices may display a virtual object without having to identify a corresponding AR tag directly. Furthermore, by determining a shared location for a shared virtual object that is common to each of the plurality of mobile devices, the illusion that the shared virtual object is shared by the plurality of mobile devices may be improved.

In some environments, including those with viewing obstructions, the location of a virtual object corresponding with a particular AR tag may be determined by identifying a predefined object, determining an orientation and a scale of the predefined object relative to a head-mounted display device (HMD) based on a model of the predefined object, and inferring the location of the virtual object based on the orientation and the scale of the predefined object. The model may comprise a 3D model including a plurality of connected parts associated with the predefined object and one or more physical constraints associated with the plurality of connected parts. In one example, a book may be modeled as two flat pieces or plates (representing the covers of the book) connected to a single axis hinge (representing the spine of the book). In another example, a book may be modeled as a plurality of pages connected to a single axis hinge. The model of the predefined object may incorporate various bearings such as hinges, ball and socket joints, and telescoping joints in order to constrain the relative motion between two of more connected parts of the plurality of connected parts. In some cases, an identification of the particular AR tag corresponding with the virtual object may be acquired by aggregating and analyzing individual identity determinations from a plurality of mobile devices within an augmented reality environment.

One issue regarding the education of children and youth involves facilitating and encouraging the reading of stories, as well as improving reading comprehension. Moreover, complex stories including multiple characters and subplots (e.g., a Shakespeare play) may be confusing to inexperienced readers or otherwise difficult to follow thereby preventing the readers from fully enjoying the reading experience. Thus, there is a need for an augmented reality system capable of generating and displaying holographic visual aids related to a story in order to enhance the reading experience of the story and to reward the reading of the story.

In one embodiment, a shared virtual object may comprise a holographic visual aid associated with an AR tag on a particular page of an augmentable book. The holographic visual aid may be viewed as being attached to the augmentable book using an HMD even though the HMD itself cannot detect the AR tag corresponding with the shared virtual object directly. In one example, a first HMD may correspond with a first end user reading the augmentable book while a second HMD may correspond with a second end user that is not able to directly view the pages of the augmentable book being read by the first end user. The first HMD may broadcast an identification of an AR tag associated with a particular page being viewed by the first end user in real-time so that the second HMD may display a virtual object corresponding with the AR tag associated with the particular page. The second HMD may identify the augmentable book and infer a location associated with the virtual object corresponding with the AR tag identified based on a model of the augmentable book. In some cases where both the first HMD and the second HMD have access to a common map or coordinate system, the first HMD may also transmit a location associated with the virtual object to the second HMD.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may be used to provide an augmented reality environment in which one or more virtual objects may be viewed without the mobile device having to identify an AR tag corresponding with the one or more virtual objects directly. In one example, a first HMD associated with a parent reading a story may view two pages of an open book, while a second HMD associated with a child listening to the story may only be able to view one page of the two pages viewable by the parent. In this case, an identity of an AR tag existing on the other page of the two pages not viewable by the child may be acquired by the second HMD from the first HMD. The identity of the AR tag may comprise a poster index or a numerical tag identifier associated with the AR tag. A shared virtual object corresponding with the AR tag (e.g., a virtual character or animation associated with the story) may be viewed from both the first HMD and the second HMD as being located at a shared location within the augmented reality environment. The shared location may be computed by each HMD independently or by an aggregation server, such as server 15, and then broadcast to each HMD within the augmented reality environment.

In some embodiments (e.g., where localization of an HMD is not possible or desirable), the identity of an AR tag and a location of a corresponding virtual object may be determined by identifying a predefined object associated with the AR tag, acquiring a 3D model of the predefined object, determining an orientation of the predefined object based on the 3D model, determining a scale of the predefined object based on the 3D model, determining an identification of the AR tag, determining a corresponding virtual object based on the identification of the AR tag, and inferring the location of the corresponding virtual object based on the 3D model and the orientation and scale of the predefined object. The 3D model may comprise a plurality of connected parts associated with the predefined object and one or more physical constraints associated with the plurality of connected parts (e.g., a maximum degree of freedom of movement or a maximum degree of rotation between a first part of the plurality of connected parts and a second part of the plurality of connected parts). In some environments, localization of a mobile device may not be possible due to one or more viewing obstructions preventing one or more landmarks or image descriptors from being identified within the environment necessary for localization of the mobile device. In some cases, localization of a mobile device may not be desirable due to the increased computational power necessary for determining the point of view or pose relative to a 3D map of the real-world environment in which the mobile device exists (e.g., the increased computational power may reduce battery lifetime).

In some embodiments, user usage patterns associated with the predefined object may be identified and used to infer a location for a virtual object corresponding with the particular AR tag. In one example, if a mobile device identifies a predefined object comprising a book and determines that the book is in an opened state, then the mobile device may infer that the pages of the book including text and pictures are facing towards the mobile device and that the front cover, back cover, and spine of the book are facing away from the mobile device. In another example, if a mobile device identifies a predefined object comprising a book and determines that the book is in an opened state, then the mobile device may infer that the pages of the book including text and pictures are facing in an upwards direction.

Figure 2A:
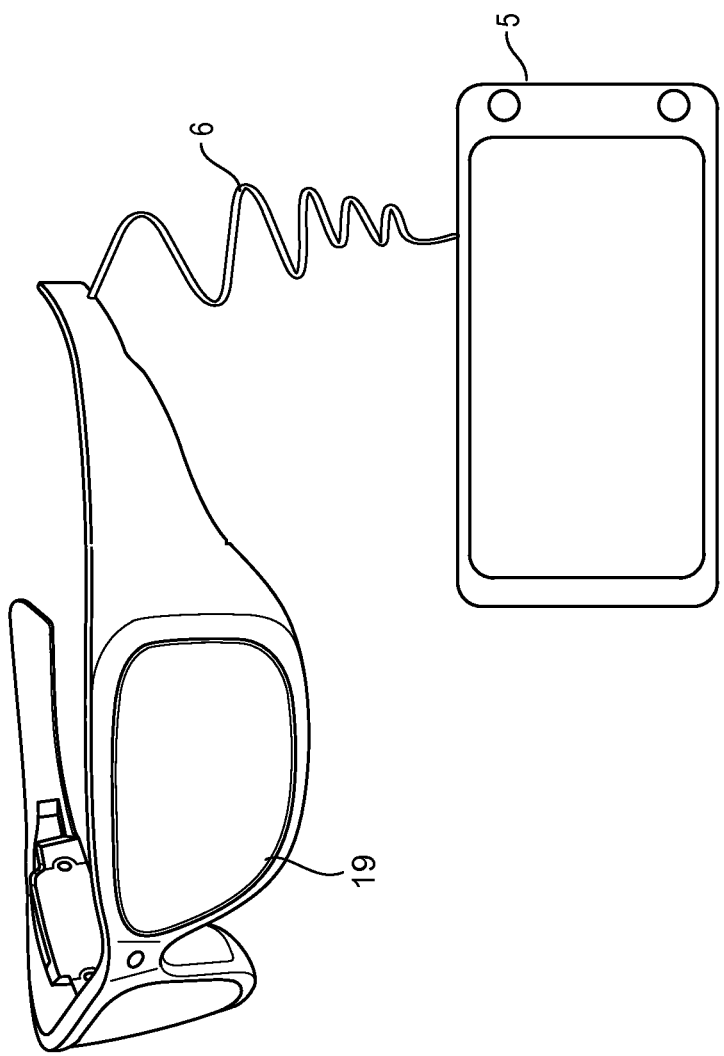
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19.

Figure 2B:
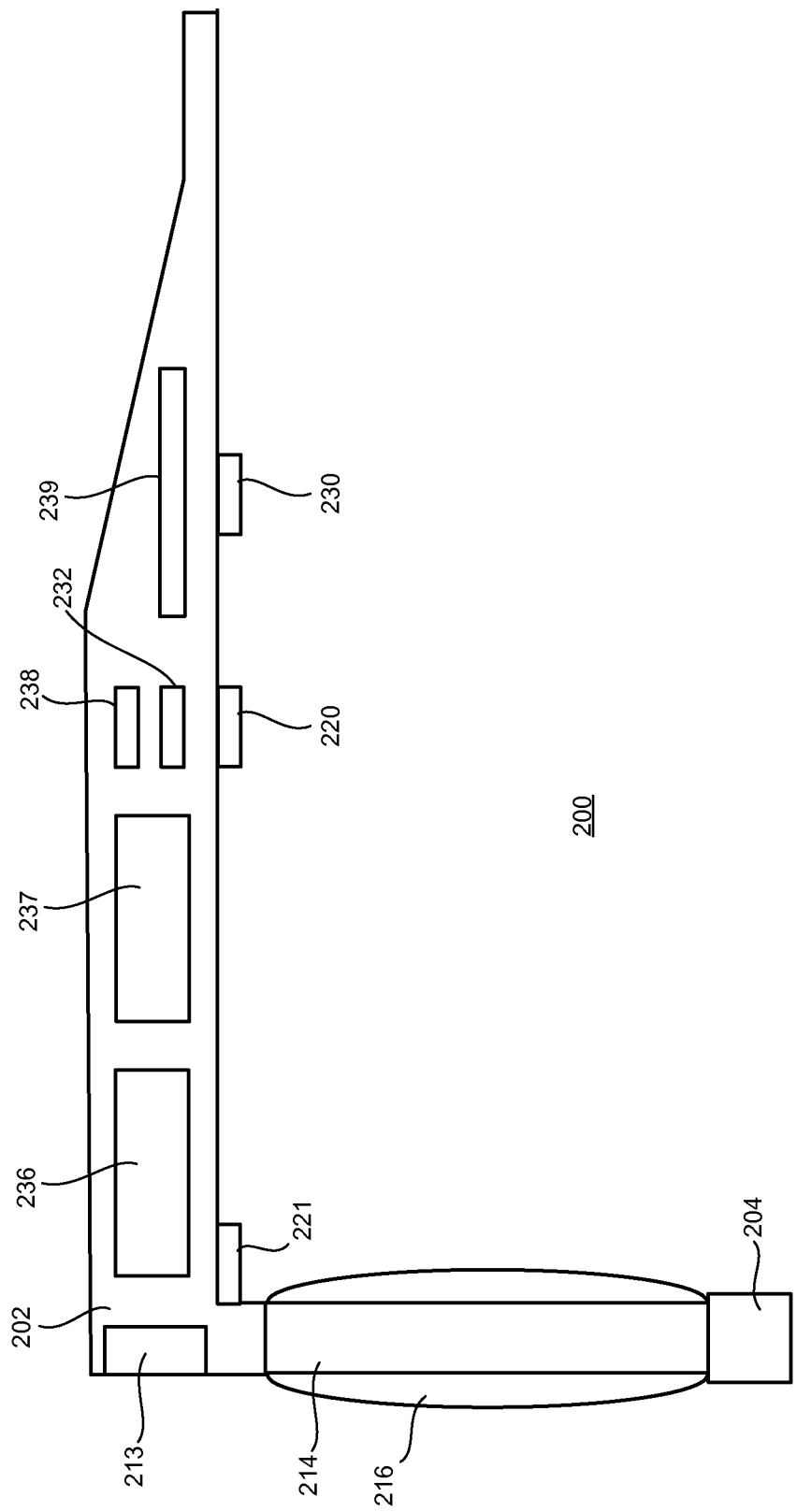
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
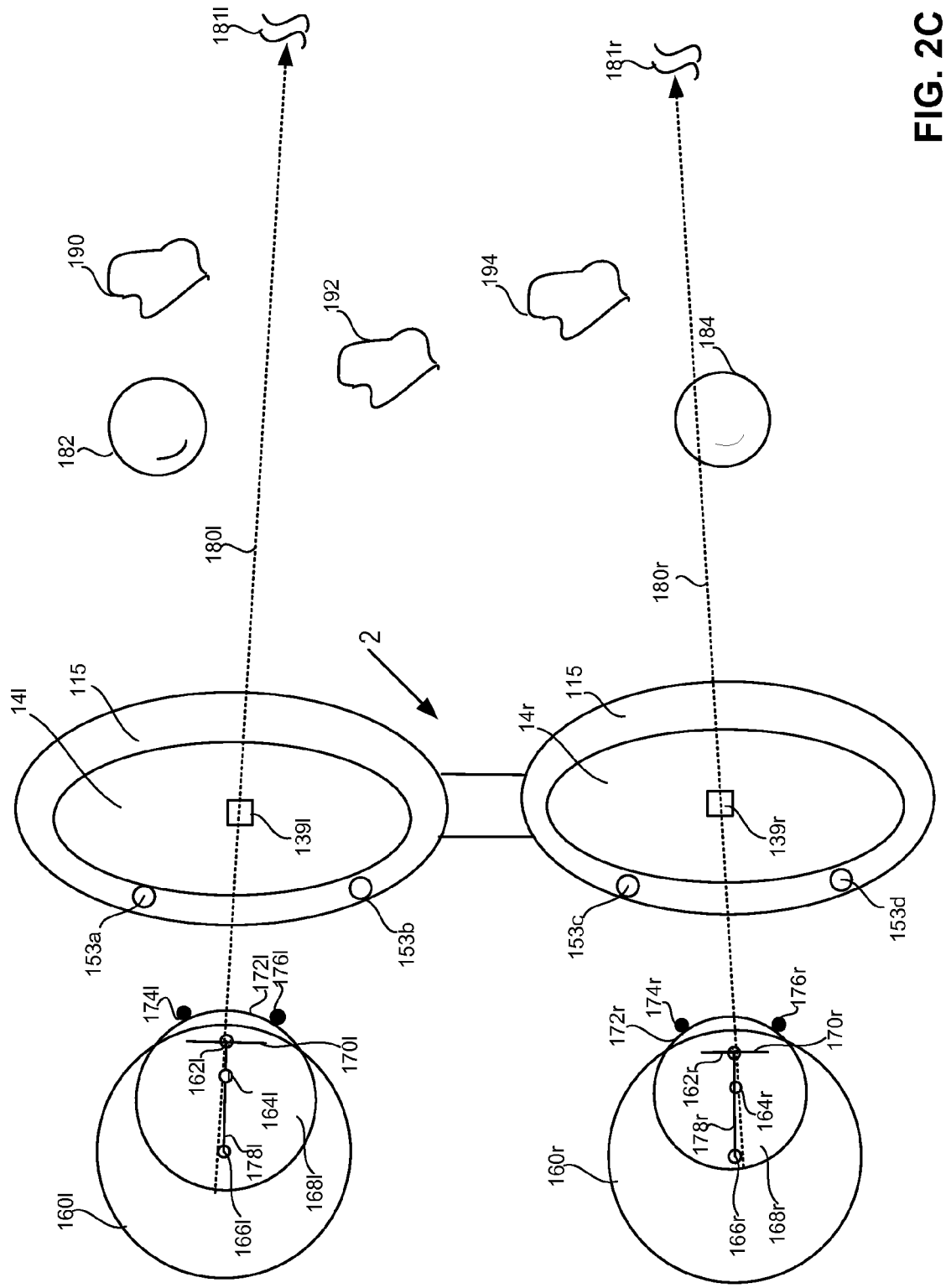
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
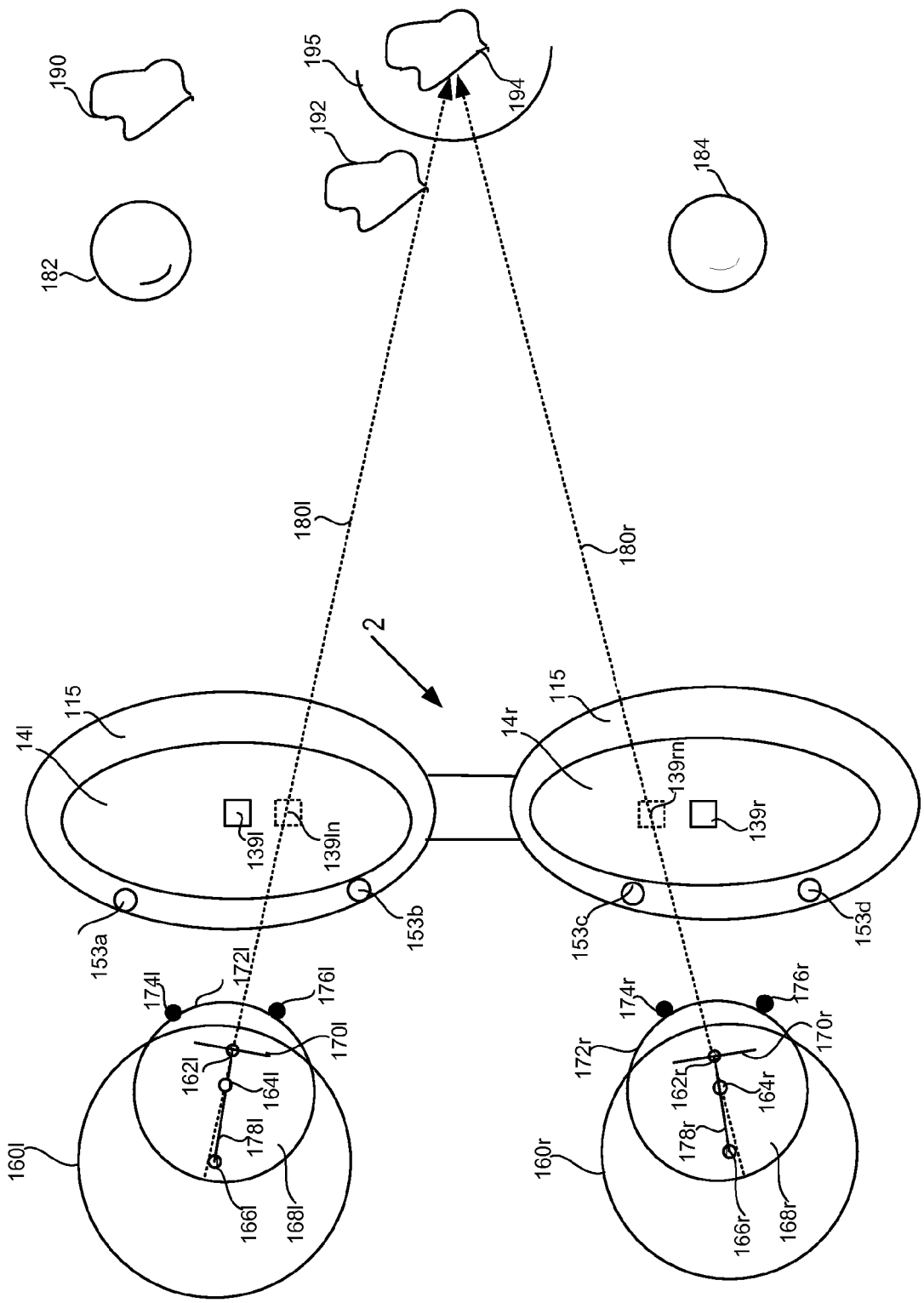
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 2E:
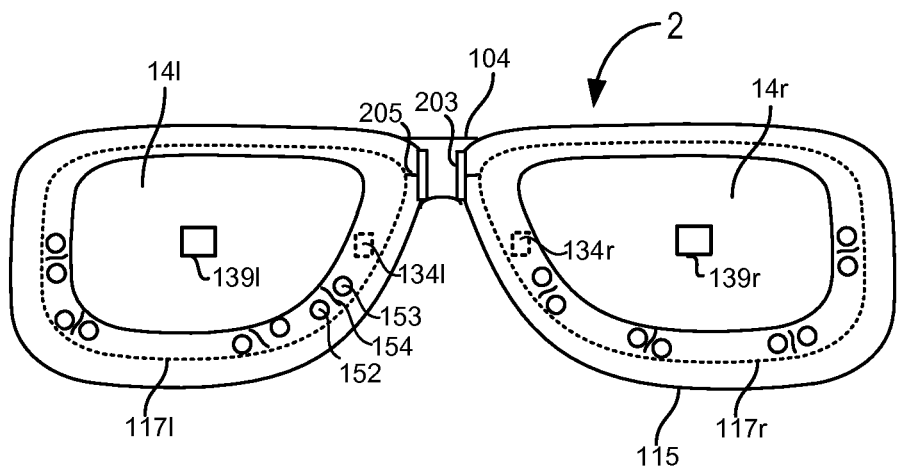
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 2E, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115.

In one embodiment, the at least one sensor 134 may be a visible light camera (e.g., an RGB camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 2E, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
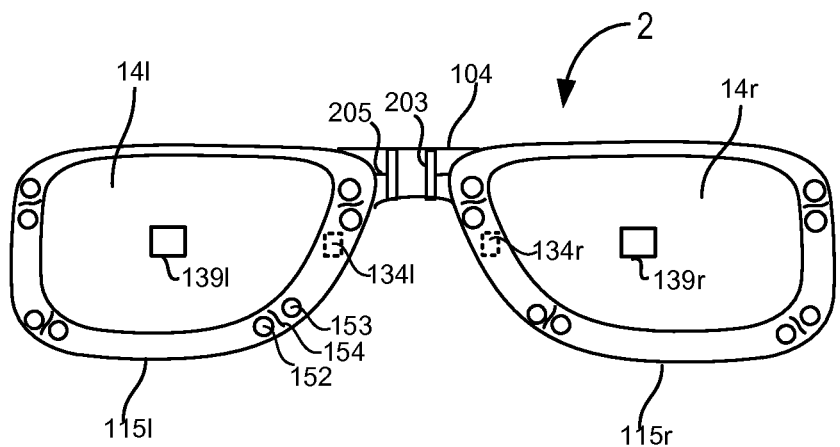
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115*l*, 115*r*. Each of the frame portions may be moved separately by the motors 203. More information about HMDs with movable display optical systems can be found in U.S. patent application Ser. No. 13/250,878, entitled "Personal Audio/Visual System," filed Sep. 30, 2011, which is herein incorporated by reference in its entirety.

FIG. 2G depicts one embodiment of a side view of a portion of an HMD 2 including an eyeglass temple 102 of the frame 115. At the front of frame 115 is a front facing video camera 113 that can capture video and still images. In some embodiments, front facing camera 113 may include a depth camera as well as a visible light or RGB camera. In one example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light cameras (e.g., an RGB camera or image sensor) and depth cameras can be used. More information about depth cameras can be found in U.S. patent application Ser. No. 12/813,675, filed on Jun. 11, 2010, incorporated herein by reference in its entirety. The data from the cameras may be sent to control circuitry 136 for processing in order to identify objects through image segmentation and/or edge detection techniques.

Inside temple 102, or mounted to temple 102, are ear phones 130, inertial sensors 132, GPS transceiver 144, and temperature sensor 138. In one embodiment, inertial sensors 132 include a three axis magnetometer, three axis gyro, and three axis accelerometer. The inertial sensors are for sensing position, orientation, and sudden accelerations of HMD 2. From these movements, head position may also be determined.

In some cases, HMD 2 may include an image generation unit which can create one or more images including one or more virtual objects. In some embodiments, a microdisplay may be used as the image generation unit. As depicted, microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124. The optical alignment may be along an optical axis 133 or an optical path 133 including one or more optical axes. The microdisplay unit 120 projects the image of the virtual object through lens system 122, which may direct the image light onto reflecting element 124. The variable focus adjuster 135 changes the displacement between one or more light processing elements in the optical path of the microdisplay assembly or an optical power of an element in the microdisplay assembly. The optical power of a lens is defined as the reciprocal of its focal length (i.e., 1/focal length) so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

More information about adjusting a focal distance of a microdisplay assembly can be found in U.S. patent Ser. No. 12/941,825 entitled "Automatic Variable Virtual Focus for Augmented Reality Displays," filed Nov. 8, 2010, which is herein incorporated by reference in its entirety.

In one embodiment, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Several different image generation technologies may be used to implement microdisplay 120. In one example, microdisplay 120 can be implemented using a transmissive projection technology where the light source is modulated by optically active material and backlit with white light. These technologies are usually implemented using LCD type displays with powerful backlights and high optical energy densities. Microdisplay 120 can also be implemented using a reflective technology for which external light is reflected and modulated by an optically active material. The illumination may be forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 2H depicts one embodiment of a side view of a portion of an HMD 2 which provides support for a three dimensional adjustment of a microdisplay assembly. Some of the numerals illustrated in the FIG. 2G above have been removed to avoid clutter in the drawing. In some embodiments where the display optical system 14 is moved in any of three dimensions, the optical elements represented by reflecting surface 124 and the other elements of the microdisplay assembly 173 may also be moved for maintaining the optical path 133 of the light of a virtual image to the display optical system. An XYZ transport mechanism in this example made up of one or more motors represented by motor block 203 and shafts 205 under control of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

Figure 3:
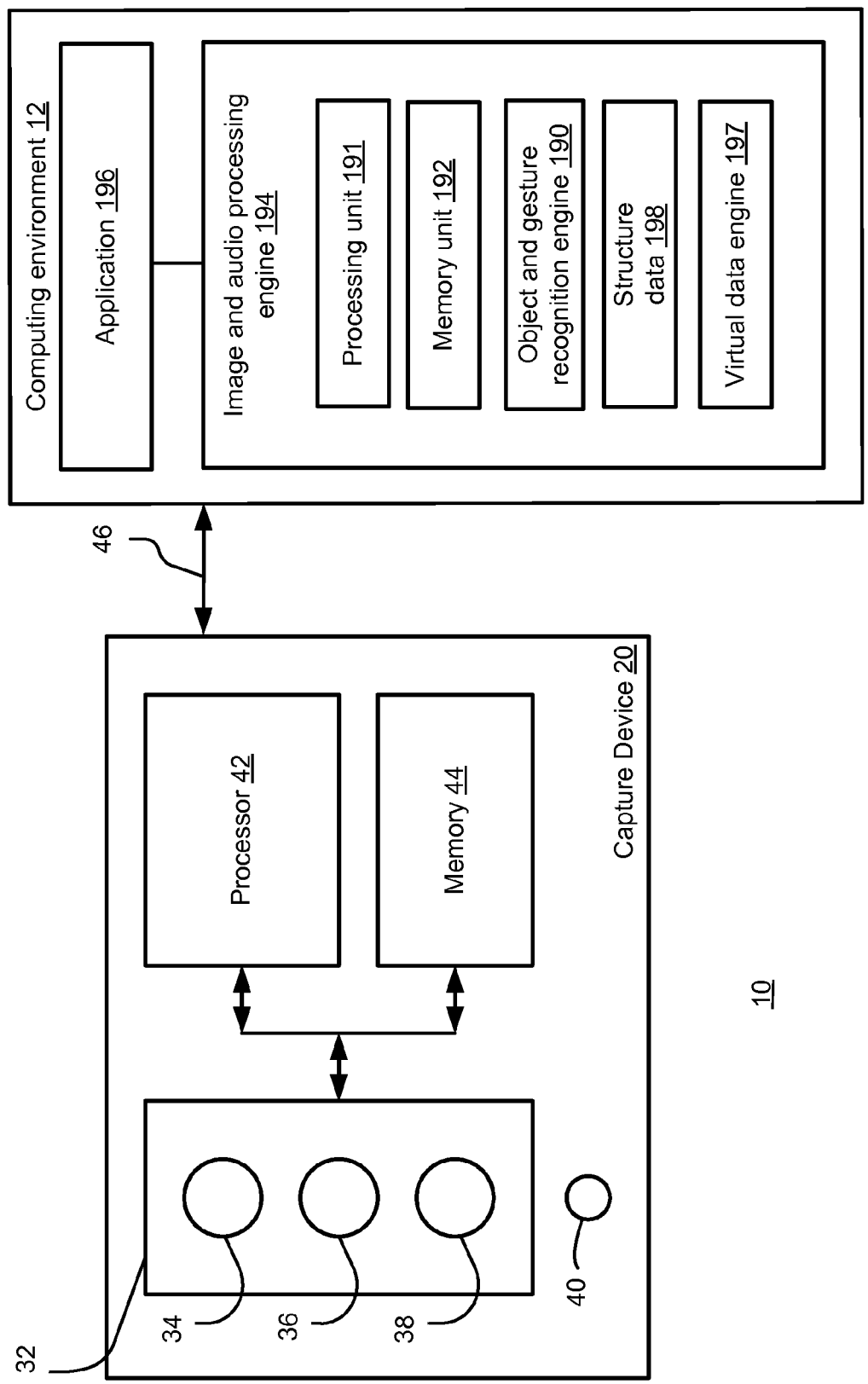
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

FIGS. 4A-4E provide examples of various environments in which one or more virtual objects associated with an augmentable book (e.g., a holographic visual aid) may be generated and displayed to an end user of an HMD while the end user is reading the augmentable book or perceiving a story from the augmentable book being read aloud. In some cases, the one or more virtual objects may be displayed even though the HMD itself cannot identify or detect the AR tags corresponding with the one or more virtual objects directly.

Figure 4A:
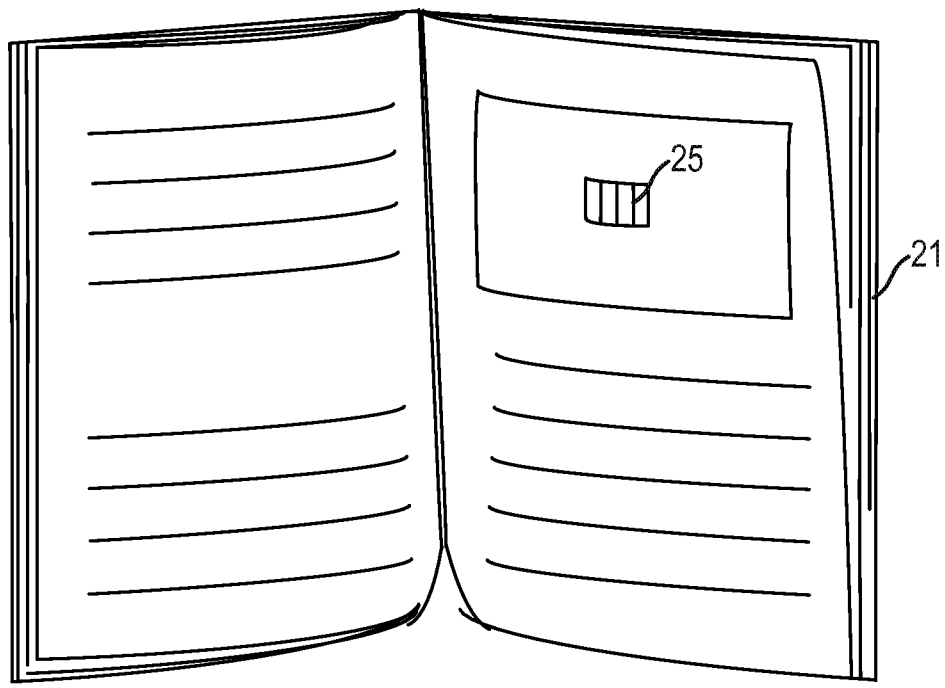
FIG. 4A depicts one embodiment of a reading object as seen by an end user wearing an HMD.

FIG. 4A depicts one embodiment of a reading object 21 as seen by an end user wearing an HMD, such as mobile device 19 in FIG. 1. The reading object may comprise a book, magazine, or piece of literature. Reading object 21 includes an augmented reality (AR) tag 25. The AR tag 25 may comprise an image or graphic that may be used to determine one or more virtual objects to display associated with the AR tag 25 such as a holographic visual aid. The AR tag 25 may also be used to determine a location on the reading object 21 in which to place the one or more virtual objects. In some embodiments, a reading object may comprise an existing book without any predetermined AR tags (e.g., a book published in 1969). In this case, the existing book may be retrofitted with an AR tag by identifying distinctive words or pictures associated with a particular page of the existing book without any predetermined AR tags.

Figure 4B:
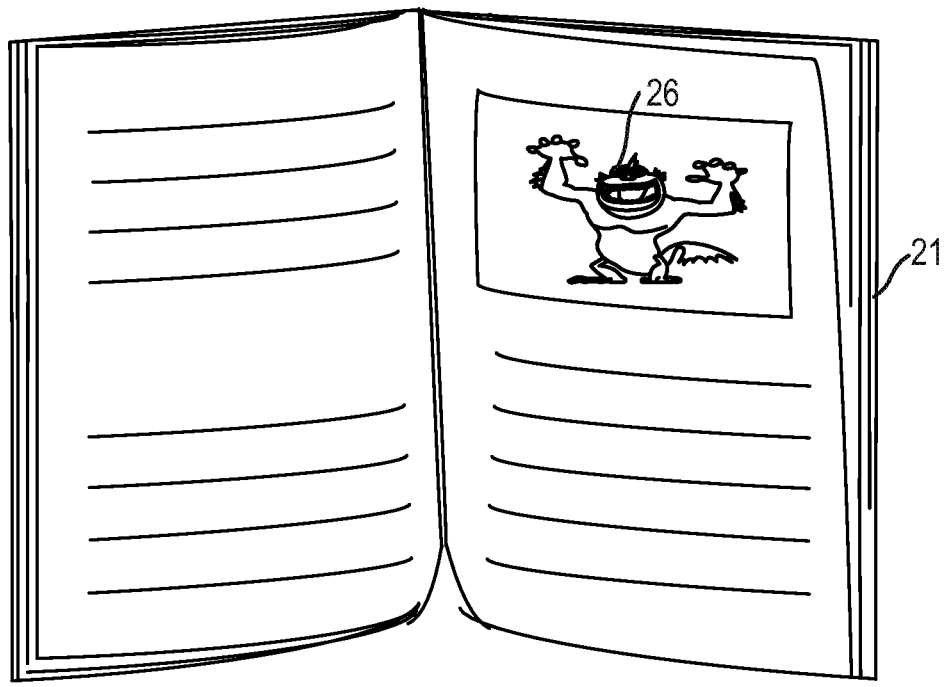
FIG. 4B depicts one embodiment of an augmented reality environment as seen by an end user wearing an HMD.

FIG. 4B depicts one embodiment of an augmented reality environment as seen by an end user wearing an HMD, such as mobile device 19 in FIG. 1. As depicted, the reading object 21 of FIG. 4A has been augmented with a virtual object 26 in a location determined by the AR tag 25 of FIG. 4A. The virtual object 26 may comprise a static image or a dynamic holographic animation comprising a sequence of images. As the virtual object 26 is displayed or overlaid over the reading object 21 as perceived through the see-through lenses of the HMD, the end user of the HMD may perceive that the virtual object 26 is part of (or attached to) the reading object 21. In some cases, the virtual object 26 may be visually attached to the reading object 21 (e.g., the reference coordinates for virtual object 26 may be relative to a coordinate space associated with the reading object 21). In this case, as the reading object 21 is moved within a field of view of an HMD, the virtual object 26 will appear fixed to the reading object.

Figure 4C:
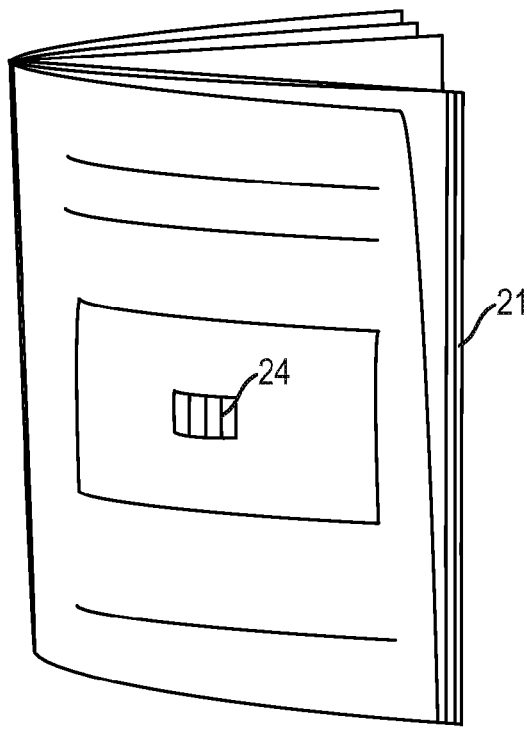
FIG. 4C depicts one embodiment of a reading object as seen by an end user wearing an HMD.

FIG. 4C depicts one embodiment of a reading object 21 as seen by an end user wearing an HMD, such as mobile device 19 in FIG. 1. The reading object may comprise a book, magazine, or piece of literature. Reading object 21 includes an augmented reality (AR) tag 24 on the front cover of the reading object 21. The AR tag 24 may comprise an image or graphic that may be used to determine one or more virtual objects to display or to determine a location for a virtual object associated with a different AR tag, such as AR tag 25 (i.e., an AR tag inside the reading object). Thus, the AR tag 24 may be used to determine a location on the cover of the reading object 21 in which to place one or more virtual objects corresponding with an AR tag that is not currently visible by the end user, such as AR tag 25. In some embodiments, a first end user associated with a first HMD may be listening to a story from the reading object 21 being read to them by a second end user associated with a second HMD. The first end user may not be able to directly see which pages of the reading object 21 that the second end user is reading (e.g., the first end user may be sitting at an angle to the reading object such that only the front cover may be viewed). The second HMD may identify a particular AR tag associated with a page being read by the second person and transmit an identification of the particular AR tag to the first HMD. The first HMD may then place a virtual object corresponding with the particular AR tag over AR tag 24 on the front cover of the reading object 21.

Figure 4D:
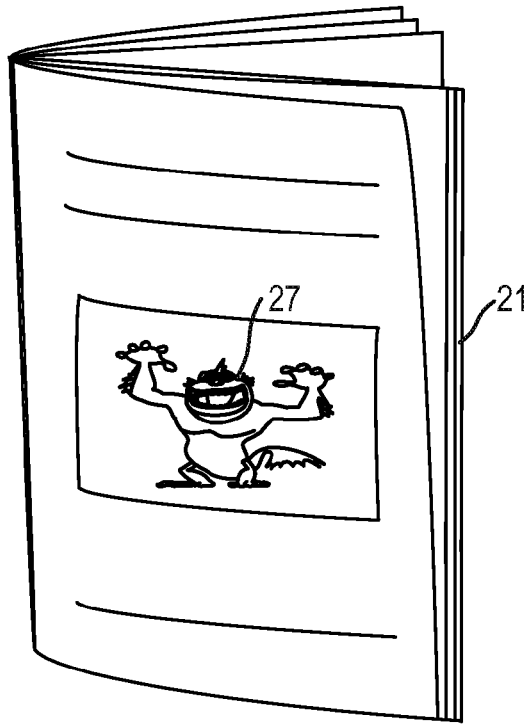
FIG. 4D depicts one embodiment of an augmented reality environment as seen by an end user wearing an HMD.

FIG. 4D depicts one embodiment of an augmented reality environment as seen by an end user wearing an HMD, such as mobile device 19 in FIG. 1. As depicted, the reading object 21 of FIG. 4C has been augmented with a virtual object 27 in a location determined by the AR tag 24 of FIG. 4C. The virtual object 27 may be based on the identification of a different AR tag, such as AR tag 25, that is different from the front cover AR tag 24 and may comprise a static image or a dynamic holographic animation comprising a sequence of images associated with the different AR tag (e.g., the virtual object displayed on the front cover of the reading object 21 may be based on a different AR tag inside the reading object 21). As the virtual object 27 is displayed or overlaid over the reading object 21 as perceived through the see-through lenses of the HMD, the end user of the HMD may perceive that the virtual object 27 is part of (or attached to) the front cover of the reading object 21. In some cases, the virtual object 27 may be visually attached to the reading object 21 (e.g., the reference coordinates for virtual object 27 may be relative to a coordinate space associated with the reading object 21). In this case, as the reading object 21 is moved within a field of view of an HMD, the virtual object 27 will appear fixed to the reading object.

FIG. 4E depicts one embodiment of an augmented reality environment 410 as seen by an end user wearing an HMD, such as mobile device 19 in FIG. 1. As depicted, the augmented reality environment 410 has been augmented with a virtual object 22. In some cases, the virtual object 22 may be generated based on the identification of an AR tag (e.g., AR tag 25 of FIG. 4A) associated with reading object 21. The location of the virtual object 22 may be determined based on an AR tag 28 within the real-world environment associated with the augmented reality environment 410. The virtual object 22 may comprise a static image or a holographic animation comprising a sequence of images. As the virtual object 22 is displayed or overlaid over the real-world environment as perceived through the see-through lenses of the HMD, the end user of the HMD may perceive that the virtual object 22 exists within the real-world environment associated with augmented reality environment 410.

In some embodiments, a plurality of HMDs may perceive virtual object 22 as being located at a shared location within the augmented reality environment 410. The shared location may correspond with a location of an AR tag within the augmented reality environment 410, such as AR tag 28. The shared location may comprise a weighted average of individually determined locations as determined by each of a plurality of HMDs within the augmented reality environment 410. The weighted average may be computed based on confidence levels corresponding with each of the individual location determinations from each of the plurality of HMDs. A confidence level may be based on various criteria such as the distance from a particular AR tag (e.g., AR tag 28), the degree to which various feature points of the particular AR tag are identified, and the degree to which various changes in luminance associated with the particular AR tag are identified.

Figure 5:
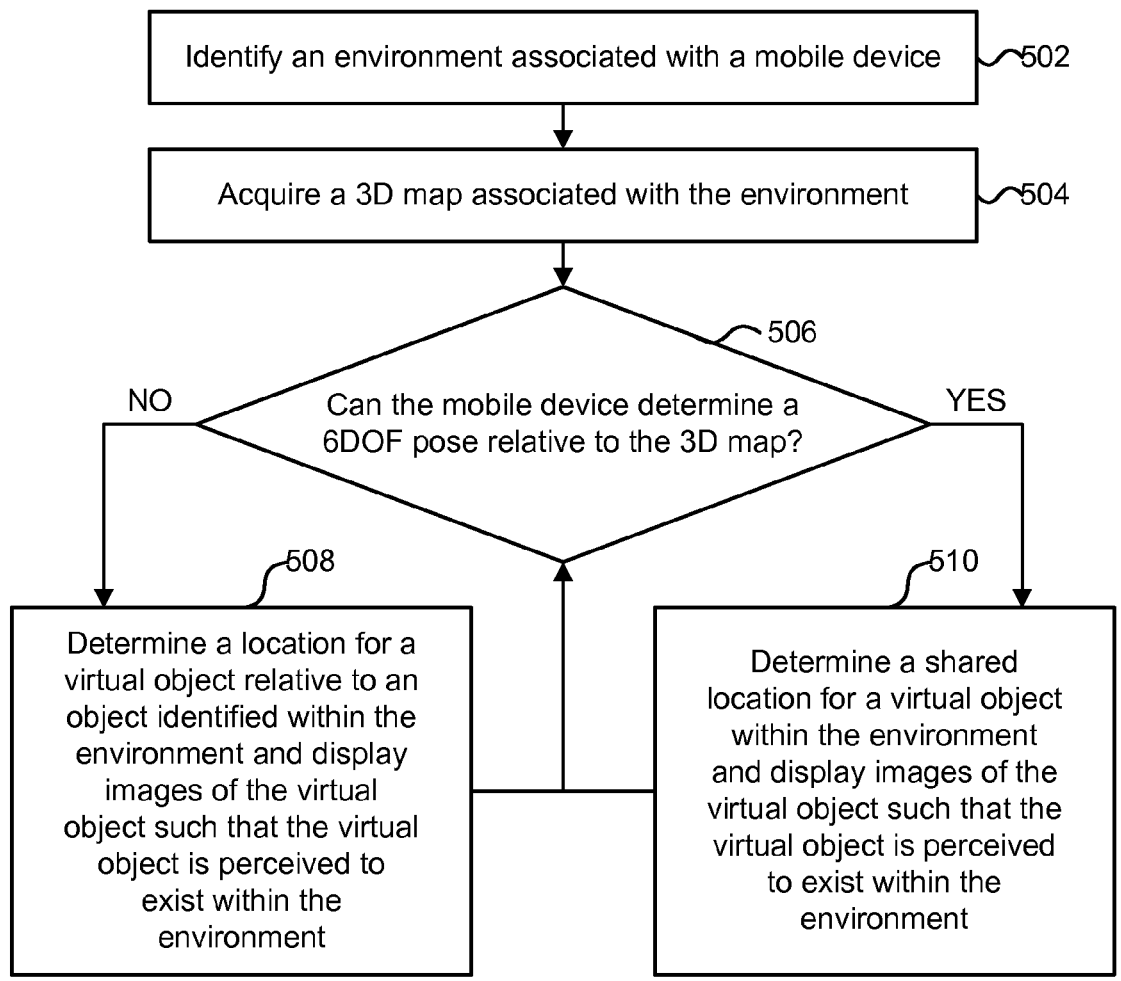
FIG. 5 is a flowchart describing one embodiment of a method for generating and displaying virtual objects.

FIG. 5 is a flowchart describing one embodiment of a method for generating and displaying virtual objects. In one embodiment, the process of FIG. 5 is performed by a mobile device, such as mobile device 19 in FIG. 1.

In step 502, an environment associated with a mobile device is identified. The environment may be identified via GPS coordinates or via image recognition of particular features or landmarks within the environment. In one example, the environment may comprise a home or a bedroom or living room within the home. In step 504, a 3D map associated with the environment is acquired. The 3D map may correspond with a common real-world coordinate system associated with the environment. The common coordinate system allows location information for various real-world objects and virtual objects within an augmented reality environment to be communicated to and from the mobile device. The 3D map may include models of various landmarks or other environmental features associated with the environment.

In step 506, it is determined whether the mobile device can determine a six degree of freedom (6DOF) pose relative to the 3D map. A 6DOF pose may comprise information associated with the position and orientation of the mobile device within the environment. More information regarding determining a 6DOF pose can be found in U.S. patent application Ser. No. 13/152,220, "Distributed Asynchronous Localization and Mapping for Augmented Reality," incorporated herein by reference in its entirety. If it is determined that the mobile device can determine a 6DOF pose, then step 510 is performed. Otherwise, if it is determined that the mobile device cannot determine a 6DOF pose, then step 508 is performed. In cases where the mobile device cannot localize itself within the environment, then it may not be possible to utilize location information relative to the 3D map.

In step 508, a location for a virtual object relative to an object identified within the environment is determined and images of the virtual object are displayed such that the virtual object is perceived to exist within the environment. In some embodiments, the location may correspond with a particular AR tag associated with the object identified. The particular AR tag may be directly identified as being located on a portion of the object by the mobile device (e.g., via image recognition techniques). In some cases, the location of the particular AR tag may be inferred using a 3D model of the object to determine an orientation and a scale of the object as perceived by the mobile device. The orientation of the object may represent an orientation of the object within the environment relative to the mobile device. The scale of the object may represent the size of the object within the environment. One embodiment of a process for determining a location for a virtual object within an environment using a 3D model and displaying one or more images corresponding with the virtual object is described later in reference to FIG. 6A. In some embodiments, after step 508 is performed, step 506 may be performed.

In step 510, a shared location for a virtual object within the environment is determined and images of the virtual object are displayed such that the virtual object is perceived to exist within the environment. In some embodiments, location information including coordinate points associated with the virtual object relative to the 3D map may be shared between a plurality of HMDs within the environment. In some cases, only location information corresponding with shared virtual objects may be shared and aggregated by the mobile device. One embodiment of a process for determining a shared location for a virtual object and displaying one or more images corresponding with the virtual object is described later in reference to FIG. 7A. In some embodiments, after step 510 is performed, step 506 may be performed.

Figure 6A:
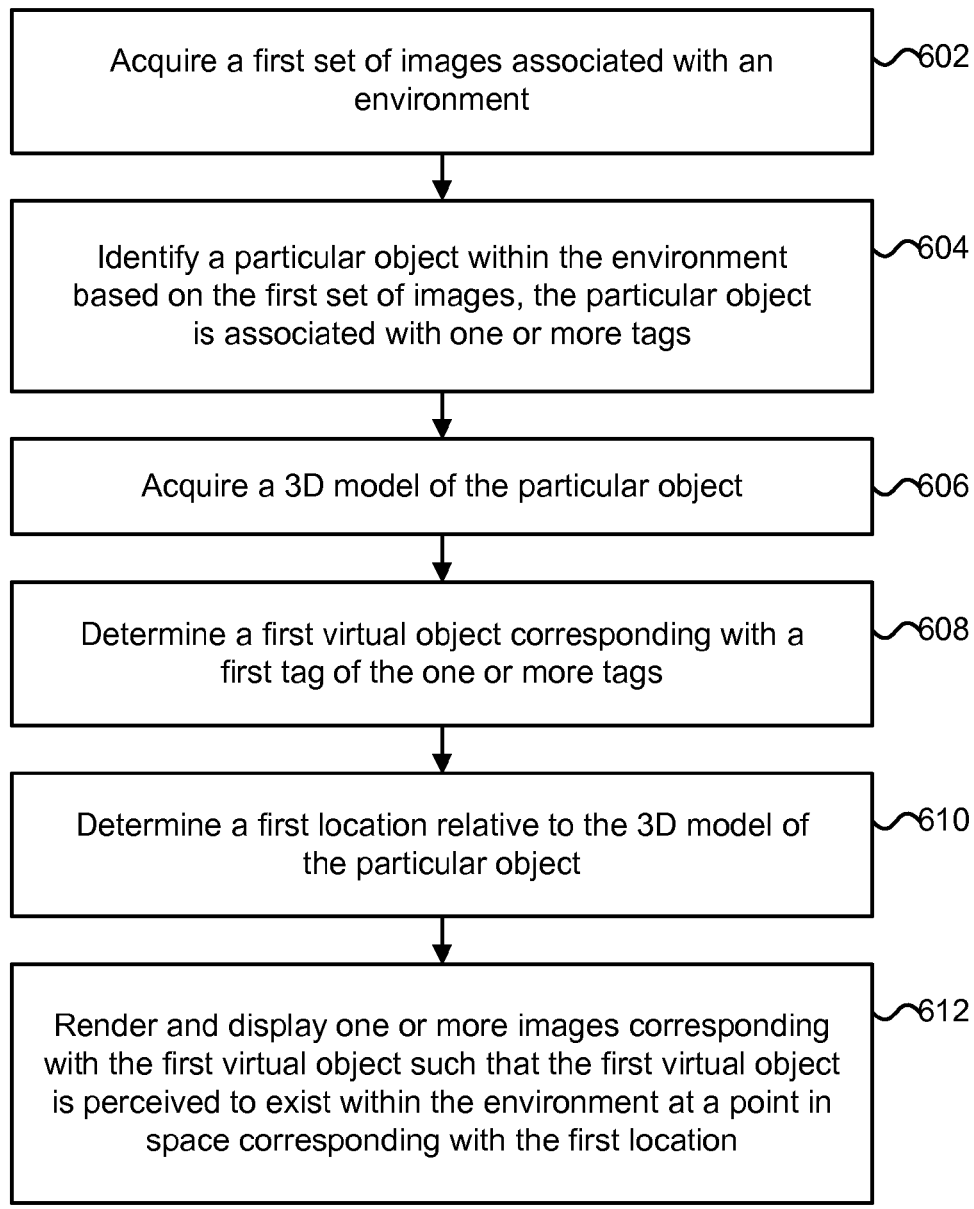
FIG. 6A is a flowchart describing one embodiment of a process for determining a location for a virtual object within an environment using a 3D model and displaying one or more images corresponding with the virtual object.

FIG. 6A is a flowchart describing one embodiment of a process for determining a location for a virtual object within an environment using a 3D model and displaying one or more images corresponding with the virtual object. The process described in FIG. 6A is one example of a process for implementing step 508 in FIG. 5. In one embodiment, the process of FIG. 6A is performed by a mobile device, such as mobile device 19 in FIG. 1.

In step 602, a first set of images associated with an environment is acquired. The first set of images may be acquired via a capture device, such as capture device 20 in FIG. 3. The first set of images may comprise color and/or depth images. In step 604, a particular object within the environment is identified based on the first set of images. The particular object may be associated with one or more tags (or AR tags) and may be identified using object and/or image recognition techniques. In one embodiment, the particular object may be identified as a particular reading object such as a book, magazine, journal, newspaper, or work of literature fixed in a tangible medium of expression. The particular reading object may be identified by a title, author, illustration, or ISBN number associated with the particular reading object. The shape of the particular reading object may also be used to identify the particular reading object as a book or magazine and to orient and direct image processing techniques to particular portions of the particular reading object (e.g., to analyze the cover of the particular reading object). In some cases, once the particular reading object has been identified, it may be highlighted or illuminated to notify the end user of an HMD that it is an augmentable reading object.

In step 606, a 3D model of the particular object is acquired. The 3D model may be acquired from a modeling server, such as server 15 in FIG. 1. The 3D model may include a plurality of connected parts associated with the particular object and one or more physical constraints associated with the plurality of connected parts. Each connected part may be associated with a shape of the part and a size of the part. The 3D model may also include models of various bearings such as hinges, ball and socket joints, and telescoping joints in order to constrain the relative motion between two of more connected parts of the plurality of connected parts. In one example, a book may be modeled as two flat pieces or plates (representing the covers of the book) connected to a single axis hinge (representing the spine of the book). In another example, a book may be modeled as a plurality of planar sheets or pages connected to a single axis hinge.

In step 608, a first virtual object corresponding with a first tag of the one or more tags is determined. In one embodiment, the particular object may comprise a reading object and the first tag may correspond with a particular page of the reading object. The first tag may be identified directly using image processing techniques or may be identified indirectly by being identified by a different mobile device or HMD within the environment. The first virtual object may be associated with a first triggering event. A triggering event may determine when the first virtual object is generated and displayed to an end user of an HMD. The first triggering event may include the detection of a particular utterance, keyword, or phrase (e.g., via audio and/or voice recognition techniques), the detection of an end user of the HMD gazing at or focusing on a particular portion of the reading object (e.g., via gaze detection techniques), or the detection of a particular gesture performed by the end user. In some embodiments, an identification of the first tag may be acquired by aggregating and analyzing individual identity determinations from a plurality of mobile devices within the environment. In some cases, the identification of the first tag may be determined by aggregating a plurality of individual identity determinations from the plurality of mobile devices and determining the tag with the highest weighted score based on confidence levels associated with each of the plurality of individual identity determinations. One embodiment of a process for determining a first virtual object is described later in reference to FIG. 6B.

In step 610, a first location relative to the 3D model of the particular object is determined. In one embodiment, the first location may be inferred based on a determination of an orientation and a scale of the particular object within the environment. The orientation of the particular object may represent an orientation of the particular object within the environment relative to a mobile device. The scale of the particular object may represent the size of the particular object within the environment. One embodiment of a process for determining a first location is described later in reference to FIG. 6C. In step 612, one or more images corresponding with the first virtual object are rendered and displayed such that the first virtual object is perceived to exist within the environment at a point in space corresponding with the first location.

Figure 6B:
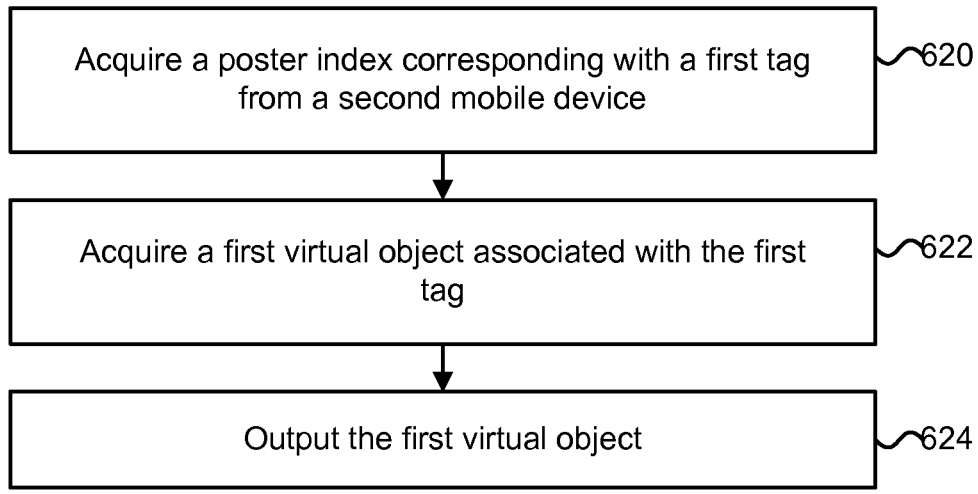
FIG. 6B is a flowchart describing one embodiment of a process for determining a first virtual object.

FIG. 6B is a flowchart describing one embodiment of a process for determining a first virtual object. The process described in FIG. 6B is one example of a process for implementing step 608 in FIG. 6A. In one embodiment, the process of FIG. 6B is performed by a mobile device, such as mobile device 19 in FIG. 1.

In step 620, a poster index corresponding with a first tag is acquired from a second mobile device. The poster index may be associated with a numerical identifier specific to the first tag. The second mobile device may broadcast or transmit the poster index upon the detection of a triggering event involving the first tag. In one example, the second mobile device may broadcast the poster index upon the detection of the first tag for at least a particular period of time (e.g., a book has been opened to a particular page including the first tag for at least a particular period of time). In step 622, a first virtual object associated with the first tag is acquired. The first virtual object may be acquired from a virtual object server, such as server 15 in FIG. 1. In some cases, each virtual object associated with a particular reading object may be preloaded on a mobile device. Thus, in cases where the first virtual object has already been preloaded on a mobile device, this step may be omitted. In step 624, the first virtual object is outputted.

Figure 6C:
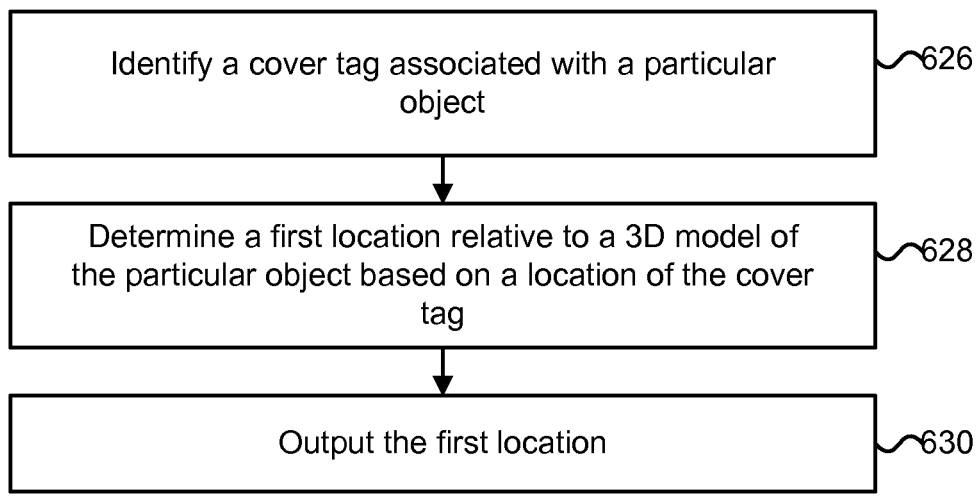
FIG. 6C is a flowchart describing one embodiment of a process for determining a first location.

FIG. 6C is a flowchart describing one embodiment of a process for determining a first location. The process described in FIG. 6C is one example of a process for implementing step 610 in FIG. 6A. In one embodiment, the process of FIG. 6C is performed by a mobile device, such as mobile device 19 in FIG. 1.

In step 626, a cover tag associated with a particular object is identified. In one embodiment, the particular object may comprise a reading object and the cover tag may comprise a particular AR tag corresponding with the front cover of the reading object. In step 628, a first location relative to a 3D model of the particular object is determined based on a location of the cover tag. In one embodiment, the first location corresponds with a point in space associated with the cover tag (e.g., the first location is at particular corner of the cover tag). In some embodiments, the particular object may comprise a reading object and the first location may correspond with a particular surface of the reading object. For example, the first location may correspond with the opposing surface of a cover page of the reading object that includes the cover tag. In one embodiment, the particular object may comprise a cube. If a particular surface of the cube has been identified (e.g., via the identification of the cover tag on the particular surface), then the first location may correspond with the opposing surface of the cube (i.e., for the case of a cube, the opposing surface is fixed relative to the particular surface). In some embodiments, the first location may be acquired from a second mobile device. For example, the second mobile device may communicate the first location relative to the 3D model of the particular object. In step 630, the first location is outputted.

Figure 7A:
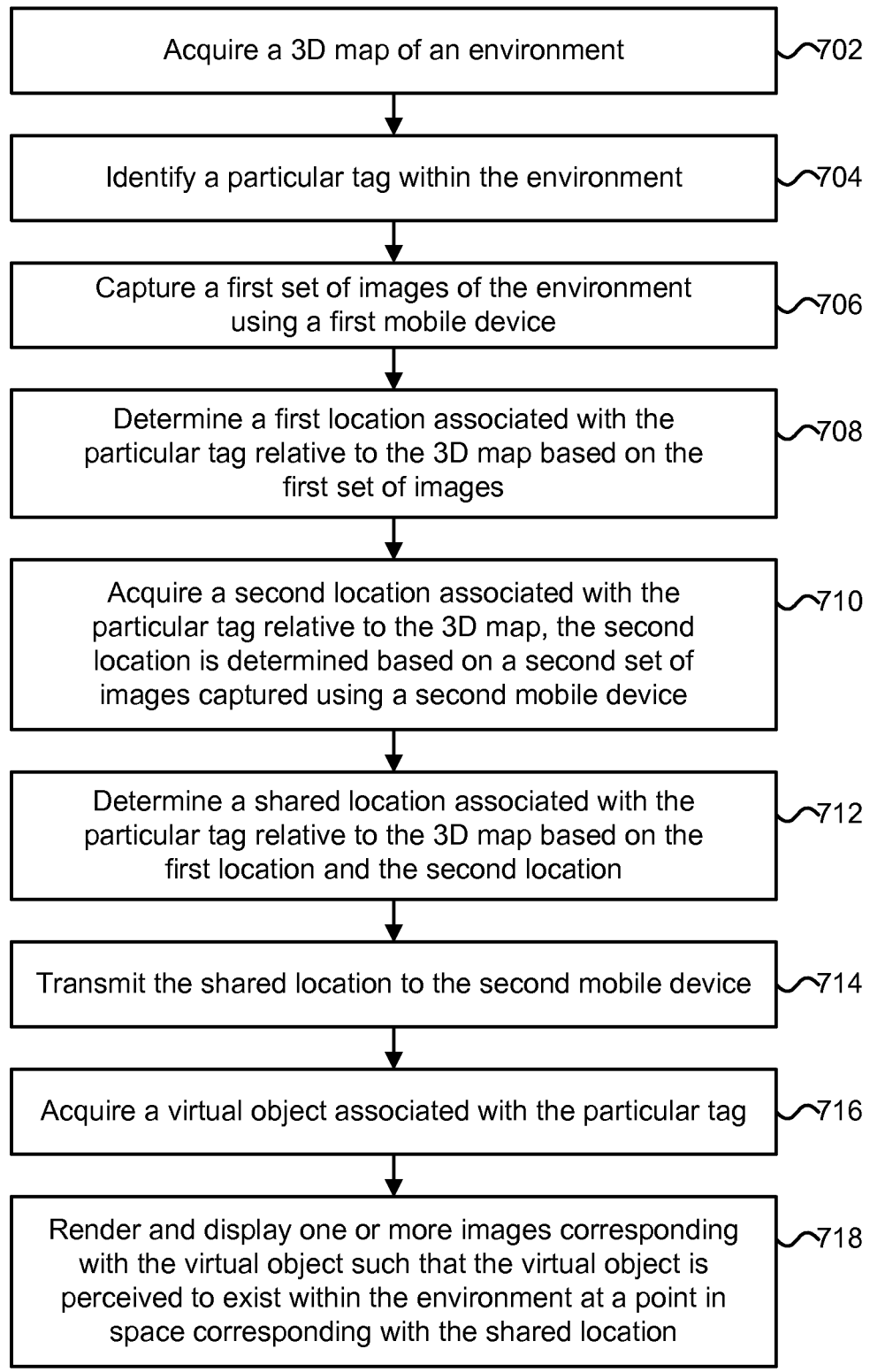
FIG. 7A is a flowchart describing one embodiment of a process for determining a shared location for a virtual object and displaying one or more images corresponding with the virtual object.

FIG. 7A is a flowchart describing one embodiment of a process for determining a shared location for a virtual object and displaying one or more images corresponding with the virtual object. The process described in FIG. 7A is one example of a process for implementing step 510 in FIG. 5. In one embodiment, the process of FIG. 7A is performed by a mobile device, such as mobile device 19 in FIG. 1.

In step 702, a 3D map of an environment is acquired. The 3D map may correspond with a common real-world coordinate system associated with the environment and include landmarks or other environmental features associated with the environment. In step 704, a particular tag is identified within the environment. The particular tag may be identified using object and/or image recognition techniques. In step 706, a first set of images of the environment is captured using a first mobile device. The first set of images may be captured by the first mobile device using a capture device, such as capture device 20 in FIG. 3.

In step 708, a first location associated with the particular tag relative to the 3D map is determined based on the first set of images. In some cases, the first location may be associated with a confidence level representing a degree of confidence in the determination of the first location. One embodiment of a process for determining a first location is described later in reference to FIG. 7B. In step 710, a second location associated with the particular tag relative to the 3D map is acquired. The second location may be determined by a second mobile device based on a second set of images captured by the second mobile device. The second location may comprise an individual location determination associated with the second mobile device and correspond with a confidence level.

In step 712, a shared location associated with the particular tag relative to the 3D map is determined based on the first location and the second location. The shared location may comprise a weighted average of the first location and the second location. The weighted average may be computed based on confidence levels corresponding with the first location and the second location. A confidence level may be based on various criteria such as the distance from the particular tag, the degree to which various feature points of the particular tag are identified, and the degree to which various changes in luminance associated with the particular tag are identified. One embodiment of a process for determining a shared location is described later in reference to FIG. 7C.

In step 714, the shared location is transmitted to the second mobile device. In some cases, the second mobile device may compare the shared location with a second shared location determined by the second mobile device. In some cases, the second mobile device may determine the second shared location based on a plurality of individual location determinations received from a plurality of HMDs within the same environment as the first mobile device. If the shared location and the second shared location differ by more than a predetermined amount, then the second mobile device may transmit or issue an alert to the first mobile device. The first mobile device may also receive the second shared location from the second mobile device and compare the second shared location with the shared location determined by the first mobile device. If the shared location and the second shared location differ by more than a predetermined amount, then the first mobile device may transmit or issue an alert to the second mobile device.

In one embodiment, the shared location may be determined by the first mobile device, transmitted to the second mobile device, and used by the second mobile device as the shared location (i.e., the first mobile device controls the shared location used by the second mobile device). In another embodiment, the shared location may be determined by the first mobile device and the second mobile device independently. The shared location may also be determined by an aggregation server, such as server 15 in FIG. 1, and then broadcast to the first mobile device and the second mobile device.

In step 716, a virtual object associated with the particular tag is acquired. The virtual object may be acquired from a virtual object server, such as server 15 in FIG. 1. In some cases, the virtual object may be preloaded on the first mobile device. In step 718, one or more images corresponding with the virtual object are rendered and displayed such that the virtual object is perceived to exist within the environment at a point in space corresponding with the shared location.

In some embodiments, a shared location may be determined based on a plurality of individual location determinations. Each of the plurality of individual location determinations may be generated by an HMD of a plurality of HMDs within an environment. Any individual location determinations that are outside a particular region of space may be deemed an outlier location and removed from the shared location calculation. The particular region of space may be determined based on a maximum distance between each of the individual location determinations. Given a set of individual location determinations that are within the particular region of space, the shared location may be determined using a weighted average of each of the individual location determinations within the set of individual location determinations. In some cases, the weighted average may be based on confidence levels associated with each of the individual location determinations. Once a shared location has been determined, the shared location may be broadcast to the plurality of HMDs.

Figure 7B:
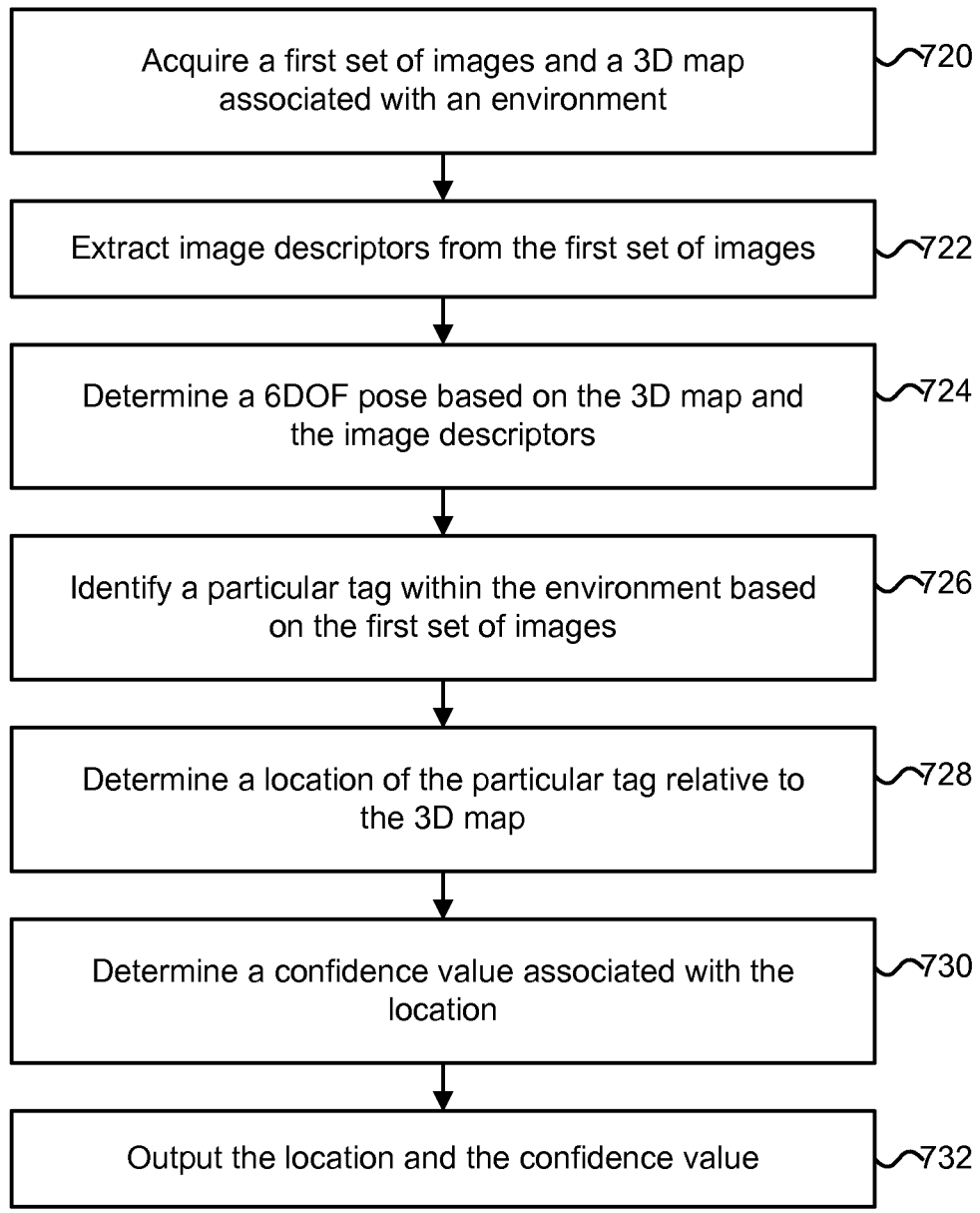
FIG. 7B is a flowchart describing one embodiment of a process for determining a first location.

FIG. 7B is a flowchart describing one embodiment of a process for determining a first location. The process described in FIG. 7B is one example of a process for implementing step 708 in FIG. 7A. In one embodiment, the process of FIG. 7B is performed by a mobile device, such as mobile device 19 in FIG. 1.

In step 720, a first set of images and a 3D map associated with an environment are acquired. The first set of images may be captured by an HMD or other mobile device within the environment. In step 722, image descriptors are extracted from the first set of images. The image descriptors may be extracted or detected within the first set of images by applying various image processing techniques such as object recognition, feature detection, corner detection, blob detection, and edge detection methods. The image descriptors may be used as landmarks in determining a particular pose, position, and/or orientation in relation to the 3D map. The image descriptors may be associated with image features that are easily observed and distinguished from other features within the environment.

In some embodiments, an image descriptor may comprise image information related to a portion of an object within the environment or to the entire object. In one example, an image descriptor may describe characteristics of the object such as its location, color, texture, shape, and/or its relationship to other objects or landmarks within the environment. Utilizing image processing techniques such as object and pattern matching, one or more image descriptors may be used to locate an object in an image containing other objects. It is desirable that the image processing techniques for detecting and matching the one or more image descriptors be robust to changes in image scale, noise, illumination, local geometric distortion, and image orientation. In one embodiment, an image descriptor may include color and/or depth information associated with a particular object (e.g., a red sofa) or a portion of a particular object within the particular environment (e.g., the top of a red sofa).

In step 724, a 6DOF pose is determined based on the 3D map and the image descriptors extracted in step 722. In one embodiment, the 6DOF pose may comprise information associated with the position and orientation of an HMD within the environment. In some cases, a first-pass estimate for the pose associated with the HMD may be obtained by utilizing GPS location information and orientation information acquired from the HMD. More information regarding determining a 6DOF pose using one or more images of an environment can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

In step 726, a particular tag is identified within the environment based on the first set of images. The particular tag may be identified by applying object and/or image recognition techniques to the first set of images. In step 728, a location of the particular tag relative to the 3D map is determined. The location may be represented by one or more points relative to a real-world coordinate system associated with the environment. In step 730, a confidence value associated with the location is determined. The confidence value may be based on various criteria such as a distance from the particular tag, the degree to which various feature points of the particular tag are identified, and the degree to which various changes in luminance associated with the particular tag are identified. In step 732, the location and the confidence value are outputted.

Figure 7C:
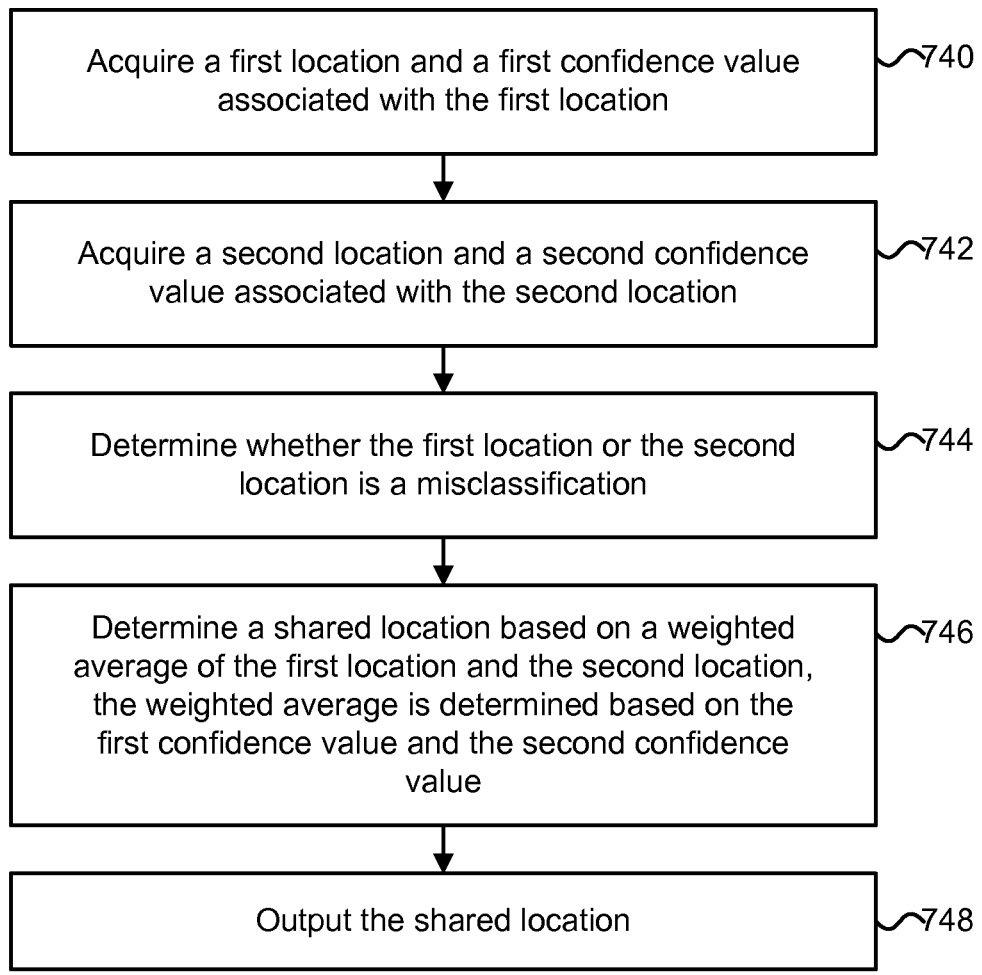
FIG. 7C is a flowchart describing one embodiment of a process for determining a shared location.

FIG. 7C is a flowchart describing one embodiment of a process for determining a shared location. The process described in FIG. 7C is one example of a process for implementing step 712 in FIG. 7A. In one embodiment, the process of FIG. 7C is performed by a mobile device, such as mobile device 19 in FIG. 1.

In step 740, a first location and a first confidence value associated with the first location are acquired. In step 742, a second location and a second confidence value associated with the second location are acquired. In step 744, it is determined whether the first location or the second location may be classified as a misclassification. In one embodiment, a location may be deemed to be misclassified if a corresponding confidence value is below a particular threshold or if the location is outside a particular region of space corresponding with other location determinations associated with the location. Location information that is deemed to be misclassified may be rejected or removed from the determination of a shared location within an environment.

In step 746, a shared location is determined based on a weighted average of the first location and the second location. The weighted average may be determined based on the first confidence value and the second confidence value (e.g., a higher confidence value may correspond with a higher weighting). In step 748, the shared location is outputted.

Figure 8:
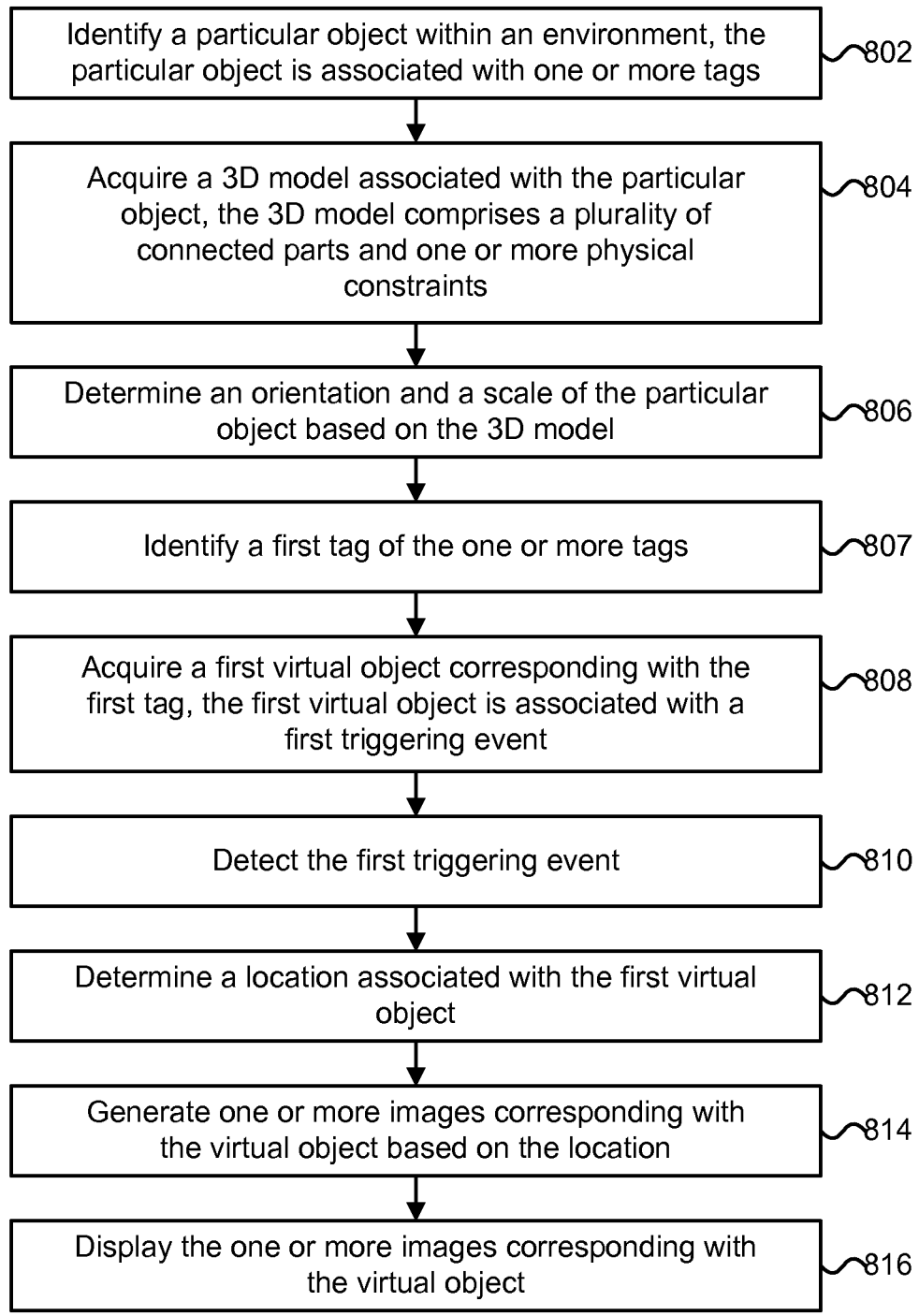
FIG. 8 is a flowchart describing one embodiment of a process for generating and displaying a virtual object.

FIG. 8 is a flowchart describing one embodiment of a process for generating and displaying a virtual object. In one embodiment, the process of FIG. 8 is performed by a mobile device, such as mobile device 19 in FIG. 1.

In step 802, a particular object is identified within an environment. A particular object may be associated with one or more tags (or AR tags). The particular object may comprise a predefined reading object. The predefined reading object may comprise an augmentable book. In step 804, a 3D model associated with the particular object is acquired. The 3D model may comprise a plurality of connected parts associated with the particular object and one or more physical constraints associated with the plurality of connected parts. In one example, an augmentable book may be modeled as two flat pieces or plates (representing the covers of the book) connected to a single axis hinge (representing the spine of the book). The one or more physical constraints may include a maximum degree of freedom of movement or a maximum degree of rotation between a first part of the plurality of connected parts and a second part of the plurality of connected parts.

In step 806, an orientation and a scale of the particular object is determined based on the 3D model. The orientation of the particular object may be determined by identifying features of the particular shape and/or one or more tags corresponding with a particular side of the particular object. The scale of the particular object may be determined by determining a distance to the particular object from an HMD viewing the particular object. In step 807, a first tag of the one or more tags is identified. In step 808, a first virtual object corresponding with the first tag is acquired. The first virtual object may be associated with a first triggering event. In one embodiment, the particular object may comprise a reading object, the first tag may correspond with a particular page of the reading object, and the first triggering event may comprise the detection of an end user of an HMD gazing at or focusing on a particular portion of the reading object for at least a particular period of time (e.g., via gaze detection techniques).

In step 810, the first triggering event is detected. A triggering event may determine when the first virtual object is generated and displayed to an end user of an HMD. The first triggering event may include the detection of a particular utterance, keyword, or phrase (e.g., via audio and/or voice recognition techniques), the detection of an end user of the HMD gazing at or focusing on a particular portion of the reading object (e.g., via gaze detection techniques), or the detection of a particular gesture performed by the end user (e.g., a hand gesture or motion). In one embodiment, the first triggering event may be satisfied if a reading object is opened to a particular page including a particular AR tag for at least a particular period of time. The first triggering event may be detected by one or more HMDs within the environment and broadcast upon the detection of the first triggering event.

In step 812, a location associated with the first virtual object is determined. In one embodiment, the location may comprise a shared location that is determined based on a plurality of individual location determinations associated with a plurality of HMDs within the environment (e.g., using a weighted average of the plurality of individual location determinations). The shared location may be specified relative to a common coordinate system or 3D map of the environment. In another embodiment, the location may comprise a location relative to the particular object itself. In one example, the particular object may comprise a reading object and the location may correspond with a cover tag on a front cover of the reading object. In another example, the particular object may comprise an augmentable book and the location may correspond with the center of an inner surface of a plate representing the front cover of the augmentable book. In one embodiment, the location may correspond with a field tag within the environment, such as AR tag 28 in FIG. 4E. In this case, a virtual object corresponding with the first tag may be displayed such that the virtual object is perceived to exist at a point in space corresponding with a center of the field tag.

In step 814, one or more images corresponding with the virtual object are generated based on the location determined in step 812. In step 816, the one or more images corresponding with the virtual object are displayed. The one or more images may be displayed on an HMD such that the virtual object is perceived to exist within the environment at a point in space corresponding with the location determined in step 812.

One embodiment of the disclosed technology includes identifying a particular tag within an environment, determining a first location associated with the particular tag in response to the identifying a particular tag, acquiring a second location associated with the particular tag from a second mobile device different from the first mobile device, determining a shared location associated with the particular tag based on the first location and the second location, acquiring a virtual object associated with the particular tag, and displaying at the first mobile device the virtual object such that the virtual object is perceived to exist at a point in space corresponding with the shared location.

One embodiment of the disclosed technology includes capturing a first set of images of an environment at a first mobile device, acquiring a 3D map of the environment at the first mobile device, identifying a particular tag within the environment based on the first set of images, determining that the first mobile device can determine a pose relative to the 3D map based on the first set of images, determining a first location associated with the particular tag relative to the 3D map in response to the determining that the first mobile device can determine a pose relative to the 3D map, acquiring a second location associated with the particular tag from a second mobile device different from the first mobile device, determining a shared location associated with the particular tag based on the first location and the second location, acquiring a virtual object associated with the particular tag, and displaying at the first mobile device the virtual object such that the virtual object is perceived to exist at a point in space corresponding with the shared location.

One embodiment of the disclosed technology includes a memory, one or more processors, and a see-through display. The memory stores a 3D map of an environment. The one or more processors identify a particular tag within the environment, determine a first location associated with the particular tag, acquire a second location associated with the particular tag from a second mobile device different from the electronic device, determine a shared location based on the first location and the second location, detect a first triggering event associated with a virtual object, and generate one or more images corresponding with the virtual object such that the virtual object is perceived to exist within the environment at a point in space corresponding with the shared location. The see-through display displays the one or more images.

One embodiment of the disclosed technology includes identifying a particular object within an environment and acquiring a 3D model of the particular object. The particular object is associated with one or more tags. The method further includes acquiring an identification of a first tag of the one or more tags from a second mobile device different from the first mobile device, determining a virtual object corresponding with the first tag based on the identification of the first tag, determining a first location associated with the virtual object relative to the 3D model, and displaying at the first mobile device the virtual object such that the virtual object is perceived to exist at a point in space corresponding with the first location.

One embodiment of the disclosed technology includes identifying a predefined object associated with an AR tag, acquiring a 3D model of the predefined object, determining an orientation and a scale of the predefined object based on the 3D model, and acquiring an identification of the AR tag. The acquiring an identification includes aggregating a plurality of individual identity determinations from a plurality of mobile devices within the environment. The plurality of mobile devices includes a second mobile device different from the first mobile device. An individual identity determination corresponding with the second mobile device comprises the identification of the AR tag. The method further includes determining a virtual object corresponding with the AR tag based on the identification of the AR tag, determining a first location associated with the virtual object based on the orientation and the scale of the predefined object, and displaying at the first mobile device the virtual object such that the virtual object is perceived to exist at a point in space corresponding with the first location.

One embodiment of the disclosed technology includes a memory, one or more processors, and a see-through display. The memory stores a 3D model of a particular object. The particular object is associated with one or more tags. The one or more processors identify the particular object within an environment, acquire an identification of a first tag of the one or more tags from a second mobile device different from the electronic device, determine a virtual object corresponding with the first tag based on the identification of the first tag, and determine a first location associated with the virtual object relative to the 3D model. The see-through display displays one or more images of the virtual object such that the virtual object is perceived to exist at a point in space corresponding with the first location.

Figure 9:
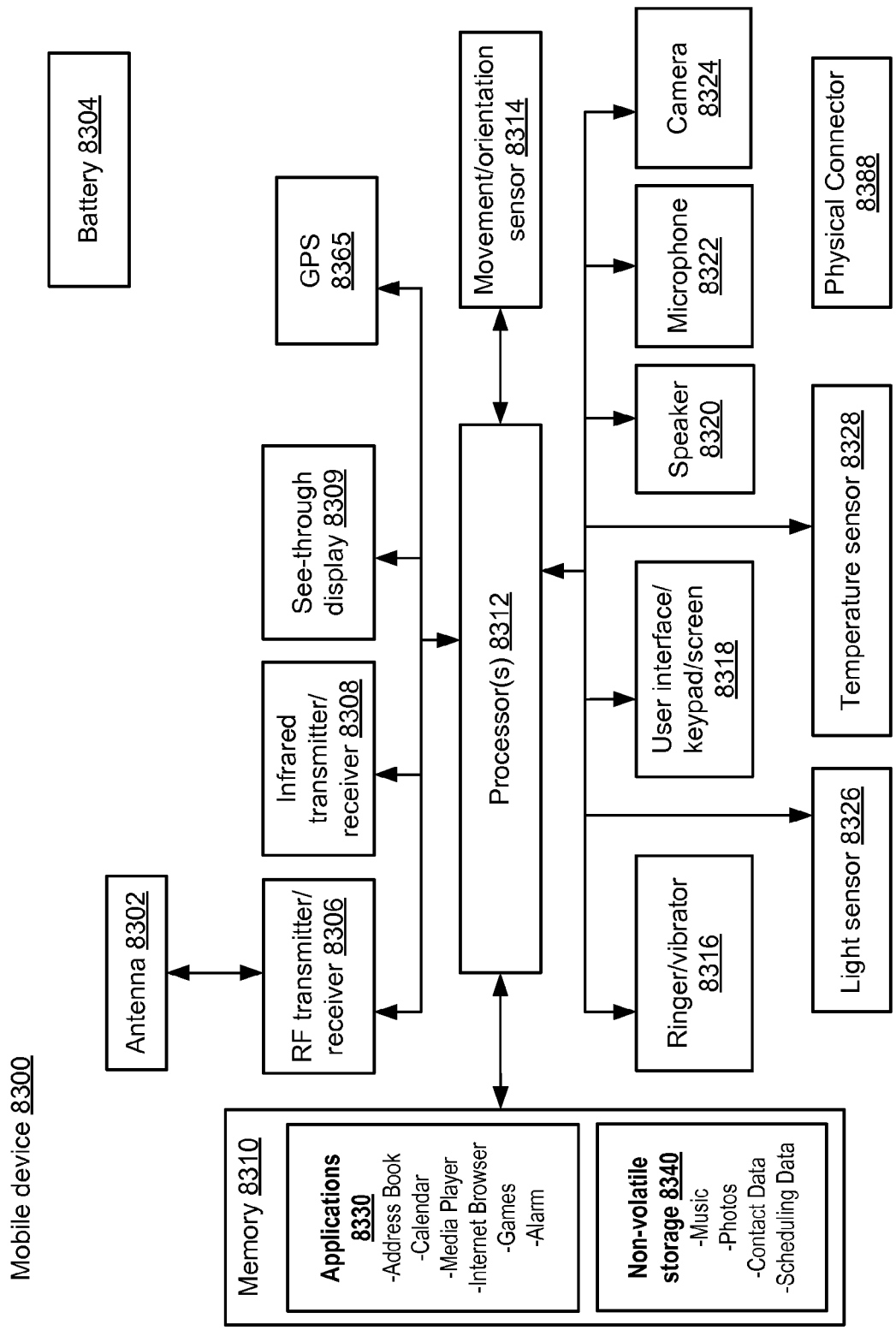
FIG. 9 is a block diagram of one embodiment of a mobile device.

FIG. 9 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating and displaying one or more virtual objects, comprising:
   identifying a particular tag within an environment, the identifying is performed by a first mobile device;
   determining a first location associated with the particular tag in response to the identifying a particular tag, the determining a first location is performed by the first mobile device, the determining a first location includes determining the first location relative to a 3D map of the environment;
   acquiring a second location associated with the particular tag from a second mobile device different from the first mobile device, the second location is relative to the 3D map of the environment, the second location is different from the first location;
   determining a shared location associated with the particular tag based on the first location and the second location, the determining a shared location includes determining a weighted average of the first location and the second location;

determining a first confidence value associated with the first location, the first confidence value corresponds with a first distance between the first mobile device and the particular tag;

acquiring a second confidence value associated with the second location from the second mobile device, the second confidence value corresponds with a second distance between the second mobile device and the particular tag, the determining a shared location includes determining the weighted average of the first location and the second location based on the first confidence value and the second confidence value;

acquiring a virtual object associated with the particular tag; and displaying at the first mobile device the virtual object such that the virtual object is perceived to exist at a point in space corresponding with the shared location.

2. The method of claim 1, further comprising:
the first confidence value is determined based on a first number of feature points of the particular tag that have been identified by the first mobile device; and
the second confidence value is determined based on a second number of feature points of the particular tag that have been identified by the second mobile device.

3. The method of claim 1, wherein:
the virtual object comprises a shared virtual object, the shared virtual object is viewable from both the first mobile device and the second mobile device as existing at the shared location within the environment.

4. The method of claim 1, further comprising:
acquiring the 3D map of the environment; and
capturing a first set of images of the environment, the determining a first location includes determining the first location relative to the 3D map based on the first set of images.

5. The method of claim 4, wherein:
the determining a shared location includes determining the shared location relative to the 3D map based on the first location and the second location.

6. The method of claim 1, further comprising:
receiving a second shared location from the second mobile device; and
determining whether to issue an alert to the second mobile device based on the shared location and the second shared location.

7. The method of claim 1, wherein:
the particular tag is associated with a particular page of a reading object; and
the virtual object comprises a holographic visual aid associated with the particular page.

8. The method of claim 7, wherein:
the reading object comprises an augmentable book.

9. One or more storage devices containing processor readable code for programming one or more processors to perform a method for generating and displaying one or more virtual objects comprising:
capturing a first set of images of an environment at a first mobile device;
acquiring a 3D map of the environment at the first mobile device;
identifying a particular tag within the environment based on the first set of images;
determining that the first mobile device can determine a pose relative to the 3D map based on the first set of images;
determining a first location associated with the particular tag relative to the 3D map of the environment in response to the determining that the first mobile device can determine a pose relative to the 3D map;
acquiring a second location associated with the particular tag from a second mobile device different from the first mobile device, the second location is relative to the 3D map of the environment, the second location is different from the first location;
determining a shared location associated with the particular tag based on the first location and the second location, the determining a shared location includes determining a weighted average of the first location and the second location, the determining a shared location includes determining a first confidence value associated with the first location, the first confidence value corresponds with a first distance between the first mobile device and the particular tag, the determining a shared location includes determining a second confidence value associated with the second location, the second confidence value corresponds with a second distance between the second mobile device and the particular tag, the determining a shared location includes determining the weighted average of the first location and the second location based on the first confidence value and the second confidence value;
acquiring a virtual object associated with the particular tag; and
displaying at the first mobile device the virtual object such that the virtual object is perceived to exist at a point in space corresponding with the shared location.

10. The one or more storage devices of claim 9, wherein:
the virtual object comprises a shared virtual object, the shared virtual object is viewable from both the first mobile device and the second mobile device as existing at the shared location within the environment.

11. The one or more storage devices of claim 9, further comprising:
the first confidence value is determined based on a first number of feature points of the particular tag that have been identified by the first mobile device; and
the second confidence value is determined based on a second number of feature points of the particular tag that have been identified by the second mobile device.

12. The one or more storage devices of claim 9, further comprising:
receiving a second shared location from the second mobile device; and
determining whether to issue an alert to the second mobile device based on the shared location and the second shared location.

13. The one or more storage devices of claim 9, wherein:
the particular tag is associated with a particular page of a reading object; and
the virtual object comprises a holographic visual aid associated with the particular page.

14. The one or more storage devices of claim 13, wherein:
the reading object comprises an augmentable book.

15. An electronic device for generating and displaying one or more virtual objects, comprising:
a memory, the memory stores a 3D map of an environment;
one or more processors in communication with the memory, the one or more processors identify a particular tag within the environment and determine a first location associated with the particular tag relative to the 3D map, the one or more processors acquire a second location associated with the particular tag from a second mobile device different from the electronic device, the second location is relative to the 3D map, the second location is different from the first location, the one or more processors determine a shared location based on a weighted average of the first location and the second location, the one or more processors detect a first triggering event associated with a virtual object, the one or more processors generate one or more images corresponding with the virtual object such that the virtual object is perceived to exist within the environment at a point in space corresponding with the shared location, the one or more processors determine a first confidence value associated with the first location, the first confidence value corresponds with a first distance between the first mobile device and the particular tag, the one or more processors acquire a second confidence value associated with the second location, the second confidence value corresponds with a second distance between the second mobile device and the particular tag, the one or more processors determine the shared location by determining the weighted average of the first location and the second location based on the first confidence value and the second confidence value; and a see-through display in communication with the one or more processors, the see-through display displays the one or more images.

16. The electronic device of claim 15, wherein:

the particular tag is associated with a particular page of a reading object; and the one or more processors detect the first triggering event by detecting an end user of the electronic device gazing at the reading object.

17. The electronic device of claim 15, wherein:

the particular tag corresponds with a field tag within the environment; and the one or more processors detect the first triggering event by detecting an end user of the electronic device performing a particular gesture.

* * * * *